US010751987B2

(12) United States Patent
Swartz et al.

(10) Patent No.: US 10,751,987 B2
(45) Date of Patent: *Aug. 25, 2020

(54) METHOD AND APPARATUS FOR AUTOMATED COMPOSITE-BASED MANUFACTURING

(71) Applicant: Impossible Objects Inc., Northbrook, IL (US)

(72) Inventors: Robert Swartz, Highland Park, IL (US); Eugene Gore, Des Plains, IL (US); Buckley Crist, Wilmette, IL (US); John Balydon, Northbrook, IL (US); Chris Wagner, Northbrook, IL (US); Nicholas Tarzian, Northbrook, IL (US); Evangeline Su, Evanstan, IL (US)

(73) Assignee: IMPOSSIBLE OBJECTS, INC., Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,906

(22) Filed: Aug. 20, 2019

(65) Prior Publication Data

US 2019/0366701 A1    Dec. 5, 2019

Related U.S. Application Data

(60) Continuation of application No. 16/059,275, filed on Aug. 9, 2018, now Pat. No. 10,384,437, which is a
(Continued)

(51) Int. Cl.
*B33Y 10/00* (2015.01)
*B29B 15/10* (2006.01)
(Continued)

(52) U.S. Cl.
CPC ............ *B33Y 10/00* (2014.12); *B29B 15/105* (2013.01); *B29C 64/147* (2017.08);
(Continued)

(58) Field of Classification Search
CPC ....... B29C 70/28; B29C 64/147; B33Y 50/02; B33Y 10/00; B33Y 30/00; B33Y 40/00
See application file for complete search history.

(56) References Cited

U.S. PATENT DOCUMENTS

| | | |
|---|---|---|
| 3,431,166 A | 3/1969 | Mizutani |
| 4,312,268 A | 1/1982 | King et al. |

(Continued)

FOREIGN PATENT DOCUMENTS

| | | |
|---|---|---|
| CN | 101181776 A | 5/2008 |
| CN | 201329424 Y | 10/2009 |

(Continued)

OTHER PUBLICATIONS

Hollingsworth & Vose (http://www.hollingsworth-vose.com/en/Products/Industrial-Products/Advanced-Fiber-Nonwovens/).
(Continued)

*Primary Examiner* — Nahida Sultana
(74) *Attorney, Agent, or Firm* — Flachsbart & Greenspoon LLC; Robert Greenspoon

(57) ABSTRACT

An apparatus and method for the automated manufacturing of three-dimensional (3D) composite-based objects is disclosed. The apparatus comprises a material feeder, a printer, a powder system, a transfer system, and optionally a fuser. The method comprises inserting a stack of substrate sheets into a material feeder, transferring a sheet of the stack from the material feeder to a printer, depositing fluid on the single sheet while the sheet rests on a printer platen, transferring the sheet from the printer to a powder system, depositing powder onto the single sheet such that the powder adheres
(Continued)

to the areas of the sheet onto which the printer has deposited fluid, removing any powder that did not adhere to the sheet, optionally melting the powder on the substrate, and repeating the steps for as many additional sheets as required for making a specified 3D object.

23 Claims, 25 Drawing Sheets

Related U.S. Application Data division of application No. 15/611,320, filed on Jun. 1, 2017, now Pat. No. 10,046,552, which is a continuation of application No. PCT/US2017/017672, filed on Feb. 13, 2017.

(60) Provisional application No. 62/294,997, filed on Feb. 12, 2016.

(51) Int. Cl.
  *B29C 64/147* (2017.01)
  *B29C 64/165* (2017.01)
  *B33Y 50/02* (2015.01)
  *B29C 64/40* (2017.01)
  *B29C 70/28* (2006.01)
  *B33Y 30/00* (2015.01)
  *B33Y 40/00* (2020.01)
  *B29C 64/386* (2017.01)

(52) U.S. Cl.
  CPC .......... *B29C 64/165* (2017.08); *B29C 64/386* (2017.08); *B29C 64/40* (2017.08); *B29C 70/28* (2013.01); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 4,393,389 A | 7/1983 | Rasekhi et al. | |
| 4,453,694 A | 6/1984 | Andreasson | |
| 4,863,538 A | 9/1989 | Deckard | |
| 5,176,949 A | 1/1993 | Allagnat et al. | |
| 5,204,055 A | 4/1993 | Sachs et al. | |
| 5,260,009 A | 11/1993 | Penn | |
| 5,263,700 A | 11/1993 | Tubb et al. | |
| 5,340,656 A | 8/1994 | Sachs et al. | |
| 5,364,657 A | 11/1994 | Throne | |
| 5,369,192 A | 11/1994 | Ko et al. | |
| 5,514,232 A | 5/1996 | Burns | |
| 5,637,175 A | 6/1997 | Feygin et al. | |
| 5,876,550 A | 3/1999 | Feygin et al. | |
| 5,988,959 A | 11/1999 | Sugata | |
| 6,147,138 A | 11/2000 | Hochsmann et al. | |
| 6,161,995 A | 12/2000 | Wakazono et al. | |
| 6,471,800 B2 | 10/2002 | Jang et al. | |
| 6,551,038 B1 | 4/2003 | Sugata et al. | |
| 6,596,224 B1 | 7/2003 | Sachs et al. | |
| 6,632,054 B2 | 10/2003 | Geiger et al. | |
| 6,740,185 B2 | 5/2004 | Baldwin | |
| 6,780,368 B2 | 8/2004 | Liu et al. | |
| 8,377,547 B2 | 2/2013 | Noguchi et al. | |
| 8,888,480 B2* | 11/2014 | Yoo .................. | B33Y 10/00 425/375 |
| 10,046,552 B2* | 8/2018 | Swartz .................. | B29C 64/386 |
| 10,384,437 B2* | 8/2019 | Swartz .................. | B29C 64/165 |
| 2002/0104935 A1 | 8/2002 | Schweizer | |
| 2004/0070582 A1 | 4/2004 | Smith et al. | |
| 2004/0112523 A1 | 6/2004 | Crom et al. | |
| 2005/0059757 A1 | 3/2005 | Bredt et al. | |
| 2006/0061618 A1 | 3/2006 | Hernandez et al. | |
| 2006/0099287 A1 | 5/2006 | Kim .................. | B33Y 30/00 425/174.4 |
| 2007/0241482 A1 | 10/2007 | Giller et al. | |
| 2008/0006958 A1 | 1/2008 | Davidson | |
| 2008/0260954 A1 | 10/2008 | Paton et al. | |
| 2009/0255428 A1 | 10/2009 | Stiel | |
| 2009/0321979 A1 | 12/2009 | Hiraide | |
| 2010/0075234 A1 | 3/2010 | Cousins ............ | H01L 31/02242 430/5 |
| 2010/0302326 A1 | 12/2010 | Morohoshi et al. | |
| 2011/0045724 A1 | 2/2011 | Bahukudumbi | |
| 2011/0101564 A1 | 5/2011 | Keenihan et al. | |
| 2011/0121491 A1 | 5/2011 | Costabeber | |
| 2012/0059503 A1 | 3/2012 | Pax et al. | |
| 2012/0105903 A1 | 5/2012 | Pettis ........................ | G06F 3/12 358/1.14 |
| 2013/0127083 A1 | 5/2013 | Bobbitt, III ............ | H01R 43/00 264/105 |
| 2013/0171431 A1 | 7/2013 | Swartz et al. | |
| 2014/0238173 A1 | 8/2014 | Swartz et al. | |
| 2014/0257549 A1 | 9/2014 | Swartz et al. | |
| 2015/0060933 A1 | 3/2015 | Ohno et al. | |
| 2015/0094837 A1* | 4/2015 | Cohen .................... | B33Y 10/00 700/98 |
| 2015/0137423 A1 | 5/2015 | Ding | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0082695 A1 | 3/2016 | Swartz et al. | |
| 2016/0214327 A1 | 7/2016 | Uckelmann ......... | B29C 67/0007 |
| 2016/0243764 A1* | 8/2016 | Hays ........................ | B29C 64/40 |
| 2016/0332250 A1 | 11/2016 | Xu ........................ | B23P 23/04 |
| 2016/0339645 A1 | 11/2016 | Swartz et al. | |
| 2017/0015066 A1* | 1/2017 | Herrmann ............. | B29C 64/268 |
| 2017/0075234 A1 | 3/2017 | Sui ............... | G03F 7/20 |
| 2017/0120331 A1 | 5/2017 | Ishida ................... | B29C 64/153 |
| 2017/0274595 A1 | 9/2017 | Swartz et al. | |
| 2017/0291223 A1 | 10/2017 | Swartz et al. | |
| 2017/0297102 A1 | 10/2017 | Chin ..................... | B22F 3/1021 |
| 2017/0297303 A1 | 10/2017 | Swartz | |
| 2017/0334133 A9 | 11/2017 | Swartz et al. | |

FOREIGN PATENT DOCUMENTS

| | | |
|---|---|---|
| CN | 104150915 A | 11/2014 |
| EP | 2776233 A2 | 9/2014 |
| EP | 2961585 A2 | 1/2016 |
| GB | 1335313 A | 10/1973 |
| JP | H11236451 | 8/1999 |
| WO | WO-2007114895 A2 | 10/2007 |
| WO | WO-2013010108 A1 | 1/2013 |
| WO | WO-2013033273 A2 | 3/2013 |
| WO | WO-2014134224 A2 | 9/2014 |
| WO | WO-2015171182 A1 | 11/2015 |
| WO | WO2017139766 A1 | 8/2017 |
| WO | WO2017139766 A4 | 8/2017 |

OTHER PUBLICATIONS

Evonik (http://corporate.evonik.com/en/products/search-products/pages/search.aspx?pfcmd=text&pfsearch=powder).

BNZ Materials (http://www.bnzmaterials.com/structural-insulation/cs85/).

Decision on PPH Request for U.S. Appl. No. 15/611,320 ("Method and Apparatus for Automated Composite-Based Additive Manufacturing"), dated Aug. 28, 2017.

Notice of Allowance for U.S. Appl. No. 14/835,690 ("Apparatus for Fabricating Three-Dimensional Printed Composites"), dated Aug. 31, 2017.

Examiner-Initiated Interview Summary for U.S. Appl. No. 14/835,690 ("Apparatus for Fabricating Three-Dimensional Printed Composites"), dated Aug. 31, 2017.

Notice of Allowance for U.S. Appl. No. 13/582,939 ("Methods and Apparatus for 3D Fabrication"), dated Jun. 21, 2017.

Examiner-Initiated Interview Summary for U.S. Appl. No. 13/582,939 ("Methods and Apparatus for 3D Fabrication"), dated Jun. 21, 2017.

(56) References Cited

OTHER PUBLICATIONS

Notice of Allowance for U.S. Appl. No. 14/703,372 ("Methods and Apparatus for Three-Dimensional Printed Composites Based on Flattened Substrate Sheets"), dated Aug. 11, 2017.
Terminal Disclaimer for U.S. Appl. No. 14/835,690 ("Apparatus for Fabricating Three-Dimensional Printed Composites"), dated Jul. 26, 2017.
Decision on PPH Request in U.S. Appl. No. 15/631,611 ("Additive Manufacturing Methods and Apparatus"), dated Sep. 19, 2017.
Corrected Notice of Allowance in U.S. Appl. No. 14/835,690 ("Apparatus for Fabricating Three-Dimensional Printed Composites"), dated Sep. 25, 2017.
Decision on PPH Request in U.S. Appl. No. 15/631,634 ("Apparatus and Process for Producing Additive Manufactured Metal Matrix Composites . . . "), dated Sep. 25, 2017.
Restriction in U.S. Appl. No. 15/611,320 ("Method and Apparatus for Automated Composite-Based Additive Manufacturing"), dated Oct. 18, 2017.
Decision on PPH Request in U.S. Appl. No. 15/631,634 ("Apparatus and Process for Producing Additive Manufactured Metal Matrix Composites . . . "), dated Oct. 27, 2017.
Aerodyne Dust Collection Systems (http://www.dustcollectorhq.com/dust-collection-systems.html).
Oneida Dust Deputy Cyclone Separator (https://www.oneida-air.com/category.asp?Id=%7bCC6B6F2A-E3D7-4F18-A53C-B5C357DFE131%7d).
International Preliminary Report on Patentability in PCT/US17/17672 ("Method and Apparatus for Automated Composite-Based Additive Manufacturing"), dated Jan. 19, 2018.
Non-Final Rejection in U.S. Appl. No. 14/190,912 ("Methods and Apparatus for Construction of Machine Tools"), dated Jan. 24, 2018.
Final Rejection in U.S. Appl. No. 14/190,912 ("Methods and Apparatus for Construction of Machine Tools"), dated Jun. 13, 2017.
International Search Report and Written Opinion for PCT/US17/17672 ("Method and Apparatus for Automated Composite-Based Additive Manufacturing"), dated Jun. 27, 2017.
Non-Final Rejection in U.S. Appl. No. 14/199,603 ("Methods and Apparatus for Photosculpture"), dated Apr. 12, 2016.
Restriction Requirement in U.S. Appl. No. 14/566,661 ("Tow Stabilization Method and Apparatus"), dated Dec. 9, 2016.
Restriction Requirement in U.S. Appl. No. 14/703,372 ("Methods and Apparatus for Three Dimensional Printed Composites Based on Flattened Substrate Sheets"), dated Jul. 25, 2016.
Non-Final Rejection in U.S. Appl. No. 14/703,372 ("Methods and Apparatus for Three Dimensional Printed Composites Based on Flattened Substrate Sheets"), dated Dec. 22, 2016.
International Search Report and Written Opinion in International Application No. PCT/US16/62319 ("Additive Manufacturing Method and Apparatus"), dated Jan. 23, 2017.
International Search Report and Written Opinion in International Application No. PCT/US16/62356 (" . . . Metal Matrix Composites . . . "), dated Jan. 23, 2017.
Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.
International Search Report for PCT/US12/52946 ("Methods and Apparatus for 3D Fabrication"), dated Jan. 10, 2013.
J. Eltgen, A Short Review of Magnetography and Its Related Materials Problems, Ind. Eng. Chem. Prod. Res. Dev., vol. 24, No. 2, 1985, pp. 196-201.
Extended European Search Report, from EP Application No. 12828967 (EP20120828967) ("Methods and Apparatus for 3D Fabrication"), Jun. 9, 2015.
International Search Report for International Applicaton No. PCT/US14/18806 ("Methods and Apparatus for Three-Dimensional Printed Composites"), dated Aug. 5, 2014.
Invitation to Pay Additional Fees for International Applicaton No. PCT/US14/18806 ("Methods and Apparatus for Three-Dimensional Printed Composites"), dated May 6, 2014.
Decision on Protest for International Applicaton No. PCT/US14/18806 ("Methods and Apparatus for Three-Dimensional Printed Composites"), dated Jun. 19, 2014.
Restriction Requirement in U.S. Appl. No. 13/582,939 ("Methods and Apparatus for 3D Fabrication"), dated Sep. 30, 2015.
Non-Final Rejection in U.S. Appl. No. 13/582,939 ("Methods and Apparatus for 3D Fabrication"), dated Mar. 29, 2016.
Final Rejection in U.S. Appl. No. 13/582,939 ("Methods and Apparatus for 3D Fabrication"), dated Oct. 7, 2016.
Non-Final Rejection in U.S. Appl. No. 14/835,690 ("Apparatus for Fabricating Three-Dimensional Printed Composites"), dated Nov. 15, 2016.
Non-Final Rejection in U.S. Appl. No. 14/566,661 ("Tow Stabilization Method and Apparatus"), dated Mar. 21, 2017.
Applicant Initiated Interview Summary in U.S. Appl. No. 14/703,372 (" . . . Flattened Substrate Sheets"), dated Feb. 9, 2017.
Invitation to Pay Additional Fees for International Application No. PCT/US17/17672 ("Method/Apparatus Automated Composite-Based Additive Manufacturing"), dated Apr. 17, 2017.
Non-Final Rejection in U.S. Appl. No. 13/582,939 ("Methods and Apparatus for 3D Fabrication"), dated Apr. 27, 2017.
Decision on Protest for PCT/US17/17672 ("Method and Apparatus for Automated Composite-Based Additive Manufacturing"), mailed May 26, 2017.

* cited by examiner

METHOD AND APPARATUS FOR AUTOMATED COMPOSITE-BASED MANUFACTURING

This is a continuation of application Ser. No. 16/059,275 filed Aug. 9, 2018 which was a divisional of application Ser. No. 15/611,320 filed Jun. 1, 2017 which claimed the benefit of International Application PCT/US17/17672, filed Feb. 13, 2017, which claimed the benefit of U.S. Provisional Application No. 62/294,997, filed Feb. 12, 2016. Applications Ser. No. 15/611,320, PCT/US17/17672 and 62/294,997 are hereby incorporated by reference in their entireties. Application Ser. No. 15/611,275 is hereby incorporated by reference in its entirety.

FIELD OF THE TECHNOLOGY

The present invention relates to additive manufacturing and, in particular to an apparatus for automated manufacturing of three-dimensional composite-based objects.

BACKGROUND

Additive manufacturing, such as three-dimensional printing, can be seen as largely a materials problem. One of the limitations of current methods is a limited materials palette and slow build speeds.

These and other limitations of the prior art are avoided by a methodology known as Composite-Based Additive Manufacturing (CBAM). CBAM is described in full in U.S. patent application Ser. No. 13/582,939, filed Nov. 2, 2012, U.S. patent application Ser. No. 14/835,690, filed Aug. 25, 2015, and U.S. patent application Ser. No. 14/835,635, filed Aug. 25, 2015, each of which are incorporated fully herein by reference.

SUMMARY

This application describes a particular method and apparatus for automating Composite-Based Additive Manufacturing (CBAM).

BRIEF DESCRIPTION OF THE DRAWINGS

Other aspects, advantages and novel features of the invention will become more apparent from the following detailed description of the invention when considered in conjunction with the accompanying drawings wherein:

FIG. 11 depicts an example embodiment of a material feeder according to

The above Figures show all or part of illustrative embodiments of this invention. The Figures do not show all of the possible details of the invention.

DETAILED DESCRIPTION

Figure 1:
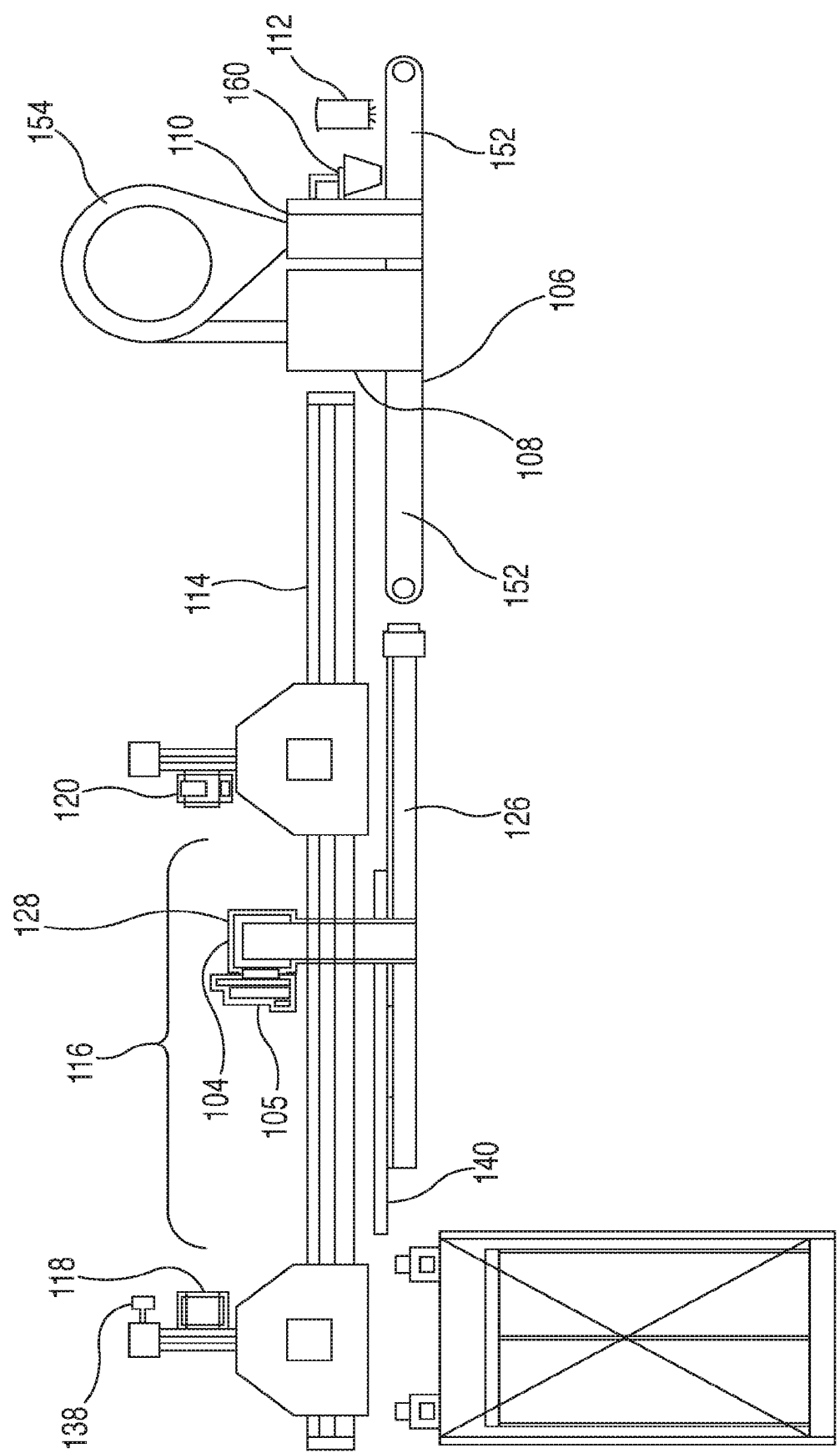
FIG. 1 is a schematic of an example embodiment of an apparatus for composite-based additive manufacturing, according to one aspect of the invention.

The CBAM process described in the incorporated prior applications (U.S. patent application Ser. Nos. 13/582,939, 14/835,690, and 14/835,635) is automated by performing the steps through a number of components or subsystems that operate in a coordinated manner. The main components of an example embodiment are shown in FIG. 1, and include a material feeder 102, a printer 104, a powder system 106 comprising a powder applicator 108 and powder remover 110, an optional fuser 112, a transfer system, and other elements that serve to connect and control the various components. While example components are shown in FIG. 1, various alternative and optional components described below are also suitable for use with the invention and are therefore to be considered as being within the scope of the invention.

General Device Operation. The material feeder 102 holds a stack of substrate sheets, such as the example carbon fiber sheets (202a, 202b) shown in FIG. 2, and moves them into proper position so that a single sheet at a time can be transferred to the printer 104. Sheets are transferred to, and positioned for, the printer 104 by means of the transfer system. The printer 104 then deposits fluid onto a substrate sheet as in the incorporated prior applications (U.S. patent application Ser. Nos. 13/582,939, 14/835,690, and 14/835,635), and may optionally include a punching mechanism for placing holes in the sheet at desired locations. For example the printer prints a layer of a 3D model of which a stack of the successive layers are used use to produce a 3D object as described in the above-mentioned applications. The powder applicator 108 then deposits thermoplastic powder onto the substrate sheet, whereupon the powder adheres to the areas of the sheet that have been made wet by the printer 104. The powder remover removes powder that did not adhere to the sheet. The fuser 112, which is optional, heats the powder on the substrate sheet in a manner sufficient to cause the powder to melt and thereby affix to the sheet, so that the powder remains on the sheet when and if the underlying fluid from the printer 104 dries. This cycle is repeated for as many additional substrate sheets 202 as required for making a specified three-dimensional (3D) part, with each sheet 202 normally representing a layer of the 3D part. A roll/web based system for material feeding can be used in an alternative embodiment.

Transfer System.

The sheets are transferred from the material feeder 102 to the printer 104, and from the printer 104 to the powder applicator, by a transfer system. One of the problems with feeding the sheets used in the CBAM process is that, in the case of non-woven carbon fiber sheets and other non-woven substrate sheets, the sheets are porous, and so conventional means for picking up the sheets do not work. For example, most lithography presses uses vacuum grippers to pick up single sheets of paper, but this only works because/when the paper sheets are non-porous, and so that the vacuum holds tightly against the top sheet in a stack but not the sheets below the top sheet.

A conventional approach to solving this problem is to feed single sheets using rollers, such as are used in laser printers and photocopiers. The problem with this approach is that sheets of non-woven materials, especially non-woven carbon fiber, and other non-wovens such as fiberglass, tend to stick together, so attempting to pick up or slide one sheet from a stack of sheets causes multiple sheets to be picked up or slide. This is due in part to the fact that fibers at the edges of each sheet are slightly frayed, causing them to tangle with the frayed edge fibers or other surfaces of the sheets directly above or below the target sheet. Also, stray fibers occur elsewhere thereby entangling with the sheet above or below. For example, in the case of carbon fiber sheets, the sheets are not only porous, but are also a matrix of fibers held together with a binder and having holes or areas where there is no fiber. In these areas, the fiber from the sheet below can become entangled with the sheet above, causing them to stick together.

Different approaches are therefore needed for porous non-woven substrate sheets, and the novel methods and devices disclosed herein are to be considered within the scope of the present invention. These approaches may include the use of Coanda grippers, such as, but not limited to, those supplied by Schmalz Inc. (for example the series SCG-1 composite grippers, and particularly Model No. SCG ixE 100 A MA), and/or needle grippers, such as, but not limited to, those supplied by Schmalz Inc. (for example the series SNG-V needle grippers and particularly Model No. SNG-V 10 1.2 V7). These approaches may also include the use of a gripper comprising certain kinds of felt, and particularly needle-felted, non-woven filamentous or fiber material (hereinafter "felted material"), such as, but not limited to, that used as the eraser material in model number 81505 "Expo White Board Care" block eraser made by Newell Rubbermaid Office Products.

Figure 4:
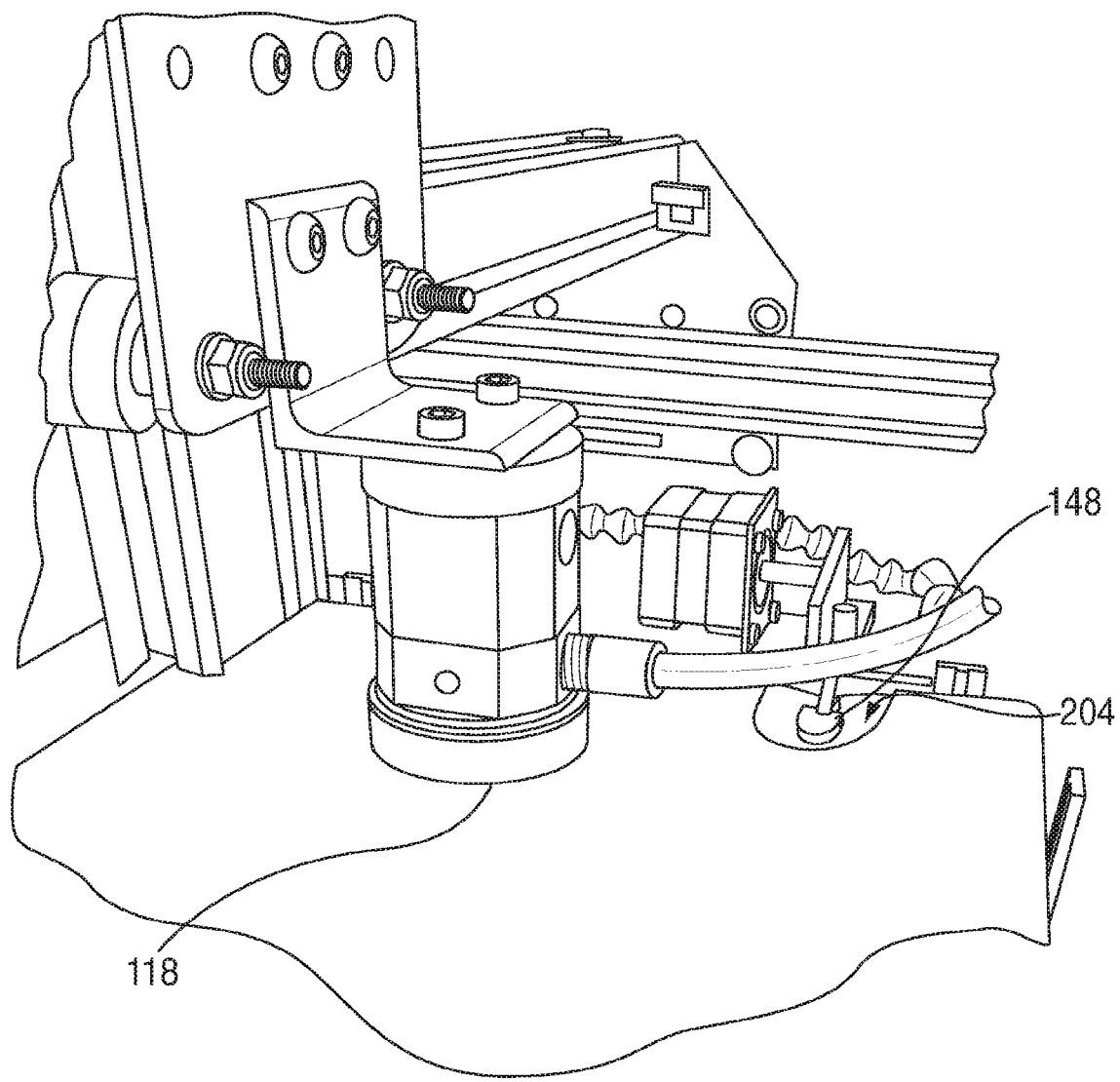
FIG. 4 is a different view of the aspects of the Coanda gripper element depicted in FIG. 3.
Figure 5:
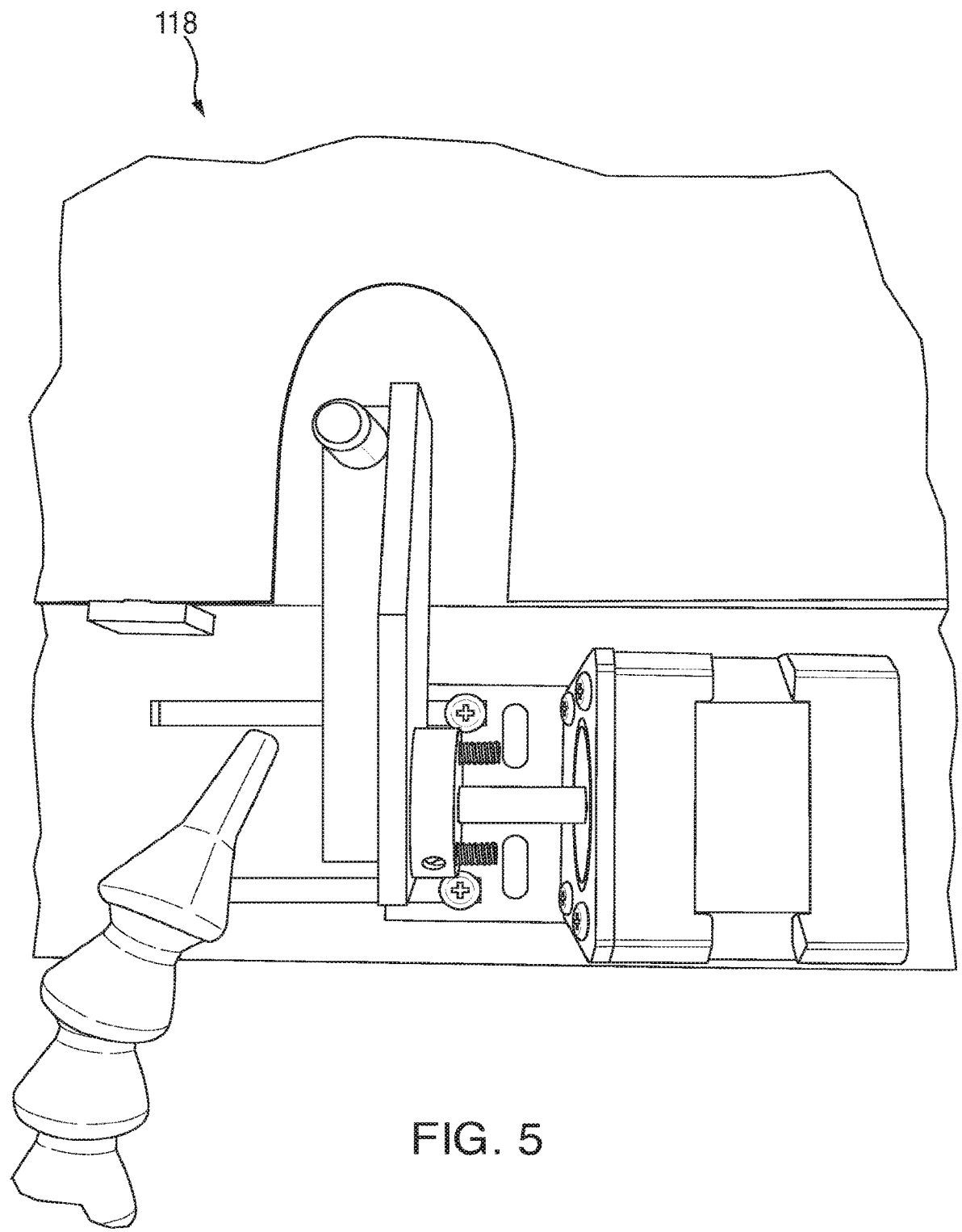
FIG. 5 is another view of the aspects of the Coanda gripper element depicted in FIG. 3.
Figure 6:
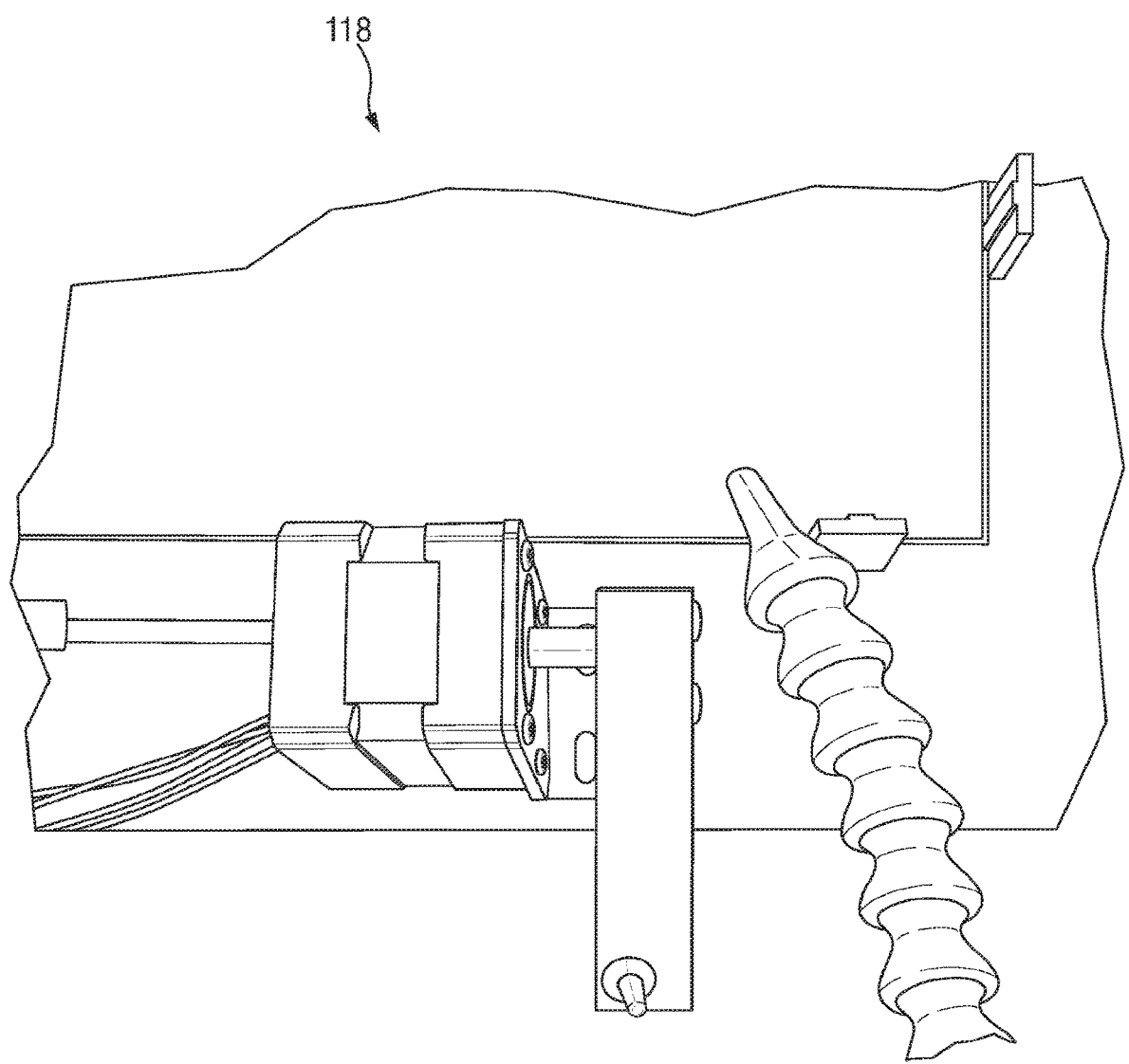
FIG. 6 is another view of the aspects of the Coanda gripper element depicted in FIG. 3.
Figure 7:
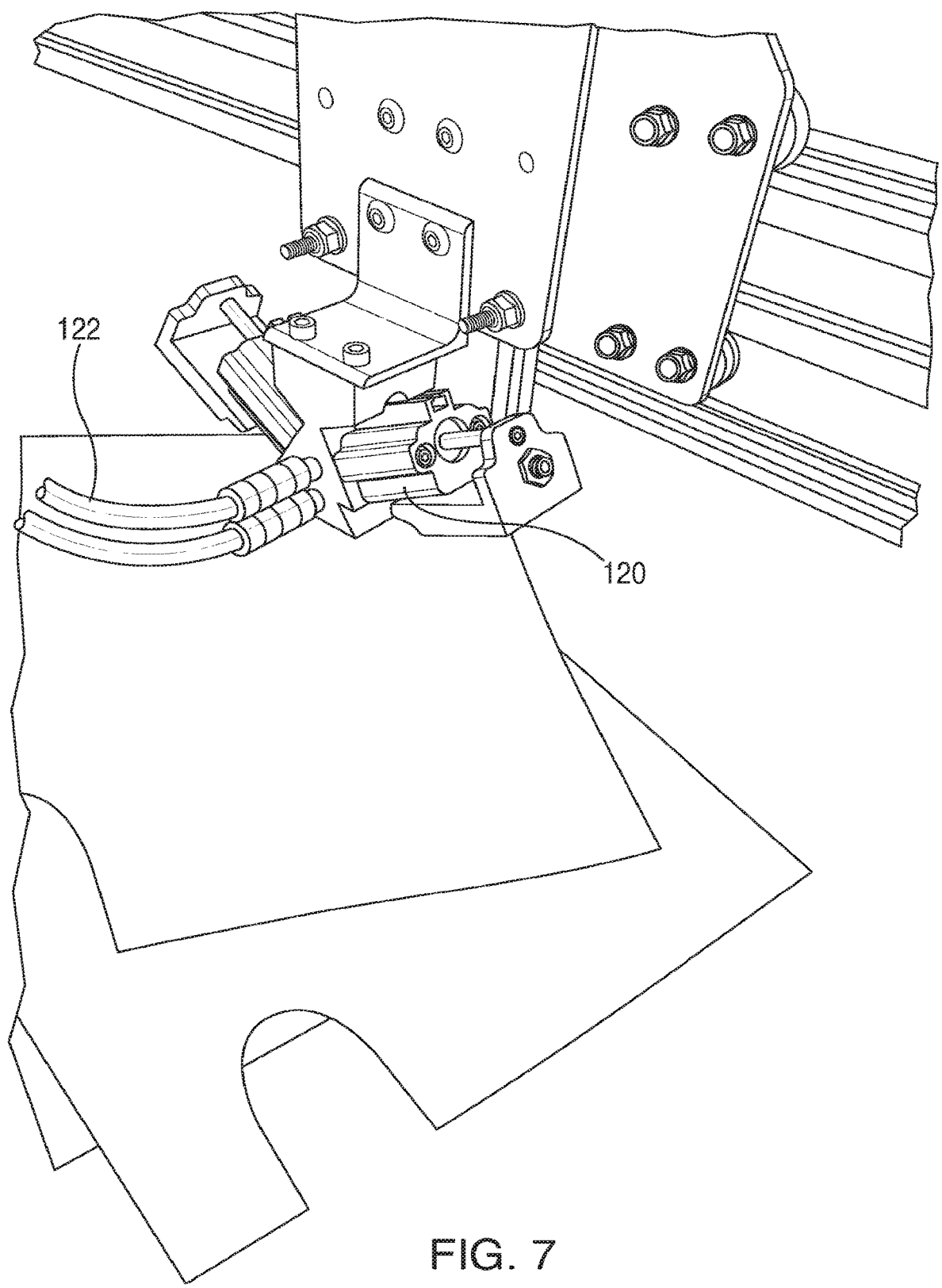
FIG. 7 depicts an example embodiment of a needle gripper element of an example transfer system according to one aspect of the invention.

As shown in FIGS. 1 and 3-7, a preferred embodiment of the gripper subsystem comprises a framework of rails 114 and belt drivers defining two XY positioners 116 further including stepper motors to additionally provide movement in the Z direction as further described below (collectively an "XYZ Positioner"). The system can be devised so that for each positioner, only X movement or XZ movement is required in which case an X or XZ positioner rather than an XY or XYZ positioner could be used. In this embodiment, a Coanda gripper 118 (FIG. 3) is mounted on the first XYZ positioner 116 and a needle gripper 120 (FIG. 7) is mounted on the second XYZ positioner 116. A Y positioner 128 is also shown in FIG. 1. The printer 104 is mounted on the Y positioner 128. The Coanda gripper 118 is also depicted in FIGS. 4-6. The Coanda gripper 118 is used for transferring substrate sheets 202 from the material feeder 102 to the printer 104. The needle gripper 120 is used for transferring substrate sheets 202 from the printer 104 to the powder applicator 108. Belt drivers contribute to moving the positioners in the XY-direction and stepper motors connected to lead screws move the grippers in the Z-direction (in some implementations, while in other implementations pneumatic cylinders or solenoids in addition to stepper motors move the grippers in the Z-direction). Both grippers are activated with forced air, through air hoses 122 connected at one end to each gripper and at the other end to a manifold (not shown), with air valves for starting and stopping the flow of air to the grippers. The manifold is connected to the controller, which sends signals at the appropriate time to open and close the air valves. Both the belt drivers and the stepper motors are in also in communication with the controller, which sends signals to the drivers and motors to turn them on and off, thereby causing the XYZ positioners 116 to move in the X-direction, the Y-direction, and/or up or down (the Z-direction), at the appropriate times and for the appropriate distances. The Z positioning can be done by solenoids or pneumatic positioners.

Serial or Parallel Operation. The system can operate so that substrate sheets 202 travel through the entirety of the subsystems only one at a time. In this embodiment, the next substrate sheet on the material feeder 102 does not advance from the feeder 102 to the printer 104 until the prior substrate sheet completes its journey through the final component in the system. Alternatively, the system can operate so that once a given substrate sheet is transferred from a given component, a next substrate sheet can be advanced to that component or another prior component in the system. In such an embodiment, for example, as a given substrate sheet is being transferred by the needle gripper 120 away from the printer 104 (that is, to the powder applicator 108), a next substrate sheet 202a . . . n) can be transferred by the Coanda gripper 118 to the printer 104 (that is, from the material feeder 102), and so on.

Felted Material Gripper Embodiment.

Figure 8:
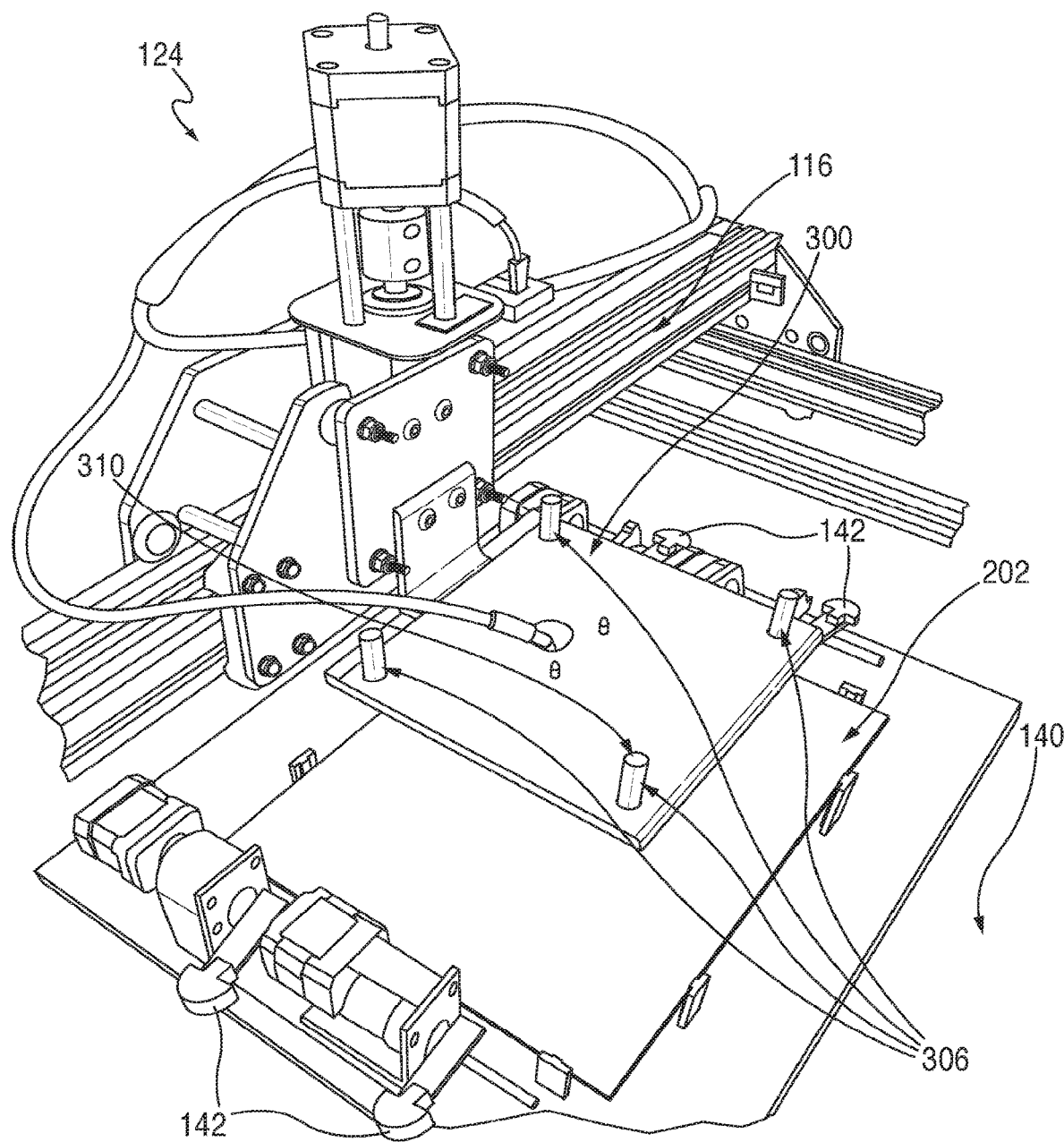
FIG. 8 depicts aspects of an example embodiment of a felted gripper element of a transfer system.
Figure 9:
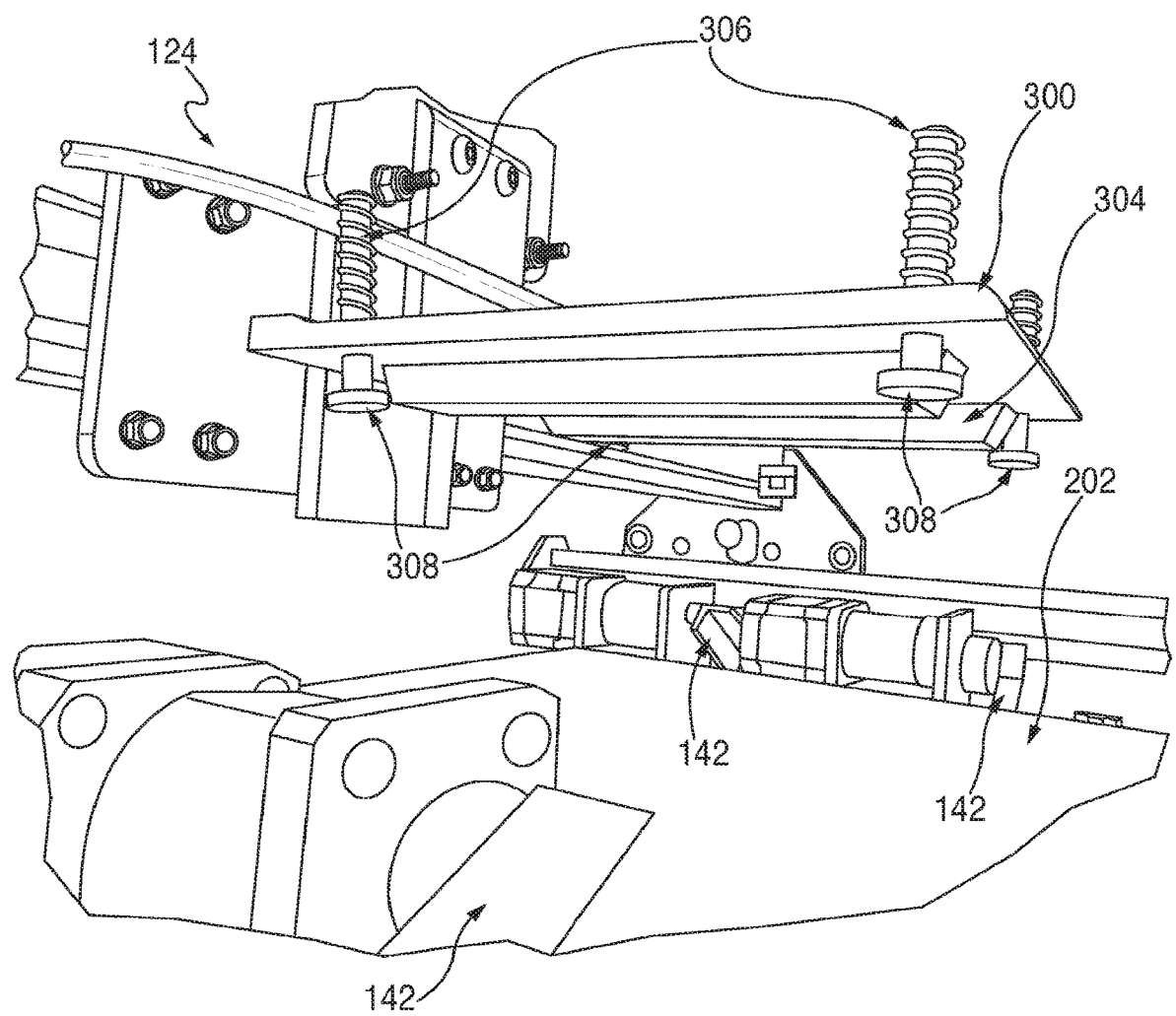
FIG. 9 is another view of the aspects of a felted gripper element depicted in FIG. 8.
Figure 10:
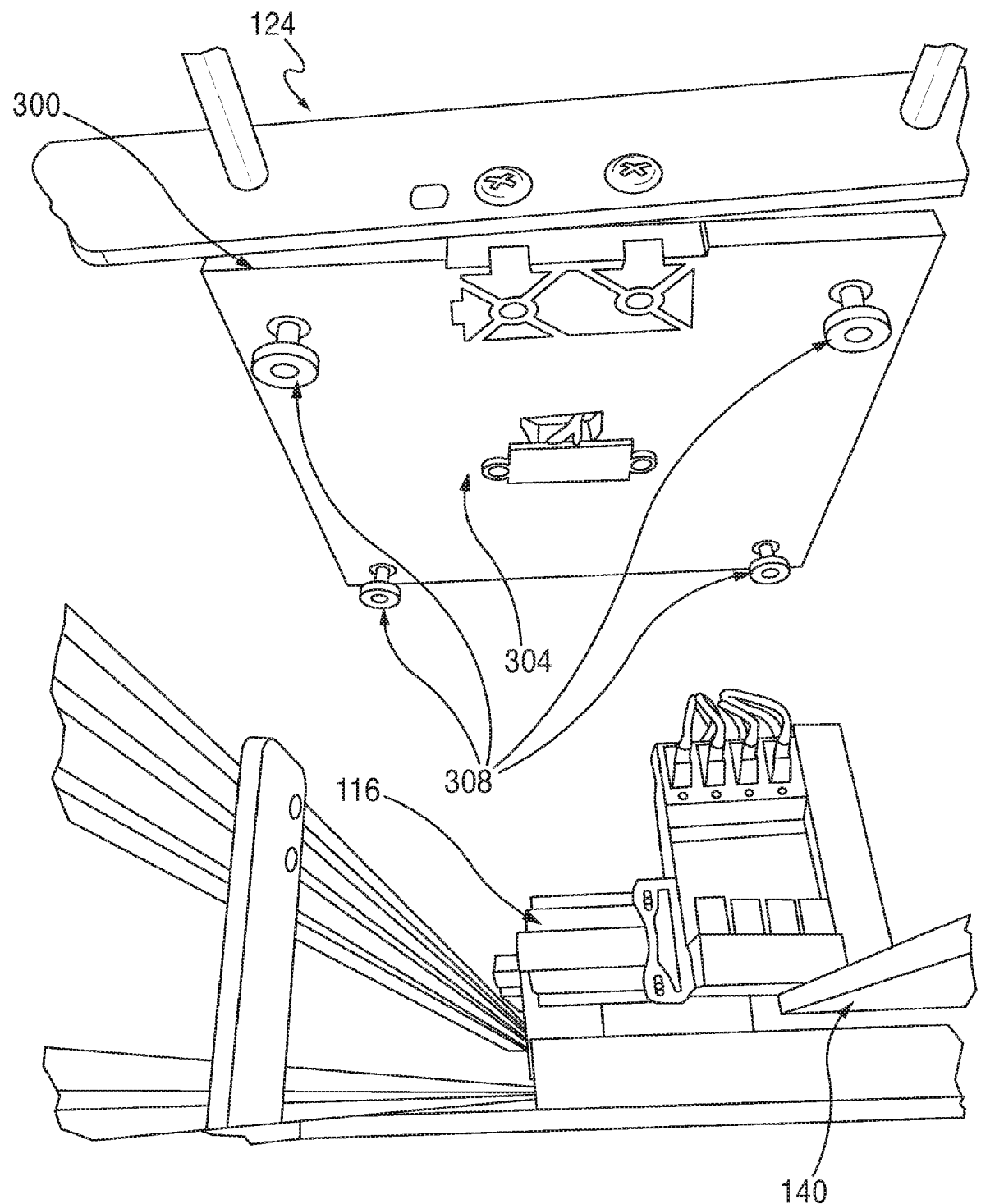
FIG. 10 is another view of the aspects of a felted gripper element depicted in FIG. 8.

In an alternative embodiment, a gripper comprising felted material is used in lieu of the Coanda gripper. In this embodiment, hereinafter "felted gripper," forced air need not be used as part of either the gripper or to blow air between or across surfaces of the substrate sheets 202, though it may be used if desired. As shown in FIGS. 8-10, the felted gripper 124 comprises a plate 300 on which felted material 304 is mounted. The exposed surface of the felted material 304 is disposed so that it faces downward and is generally parallel to the top surface of a top substrate sheet when sitting on the platform 132 of the material feeder 102.

Figure 2:
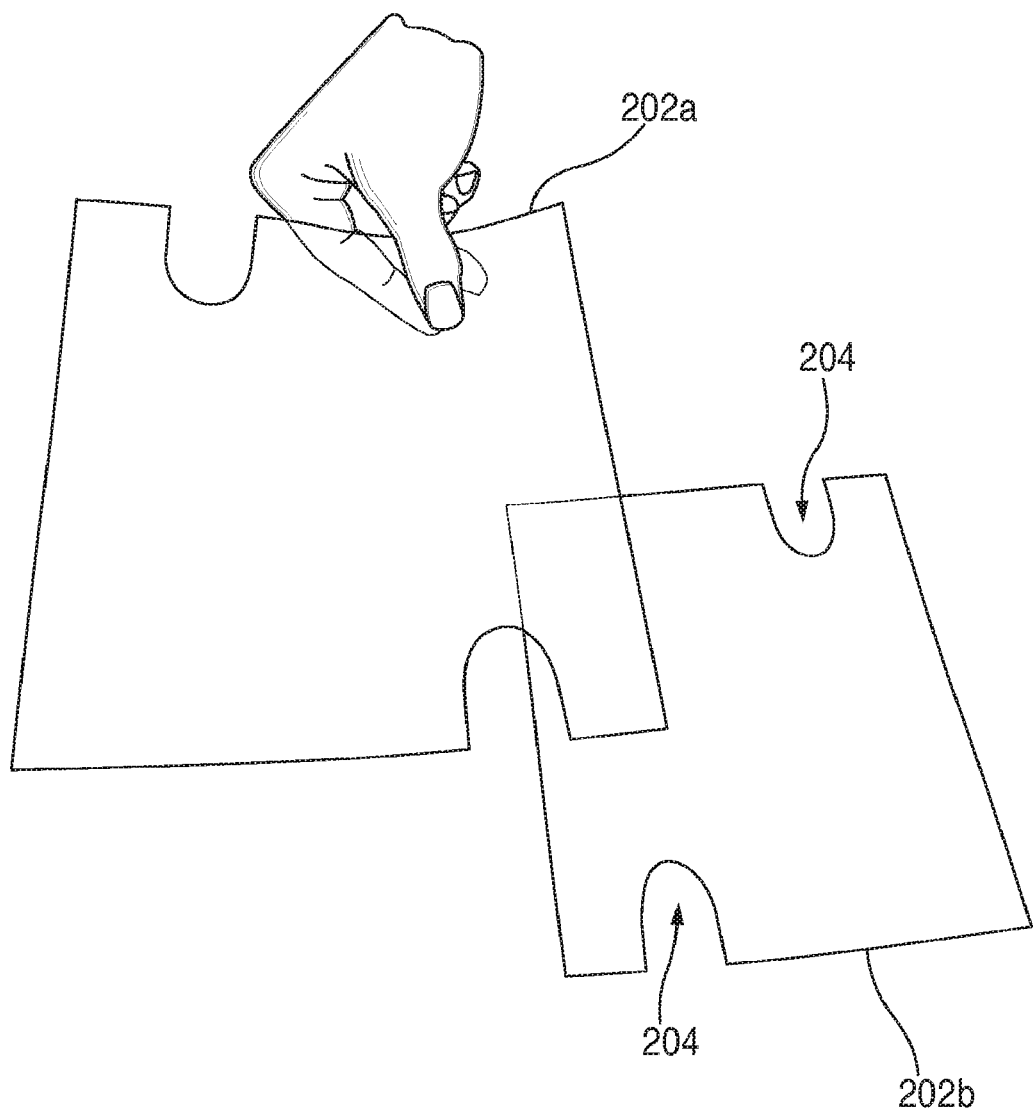
FIG. 2 is an example substrate layer useable in the present invention.
Figure 3:
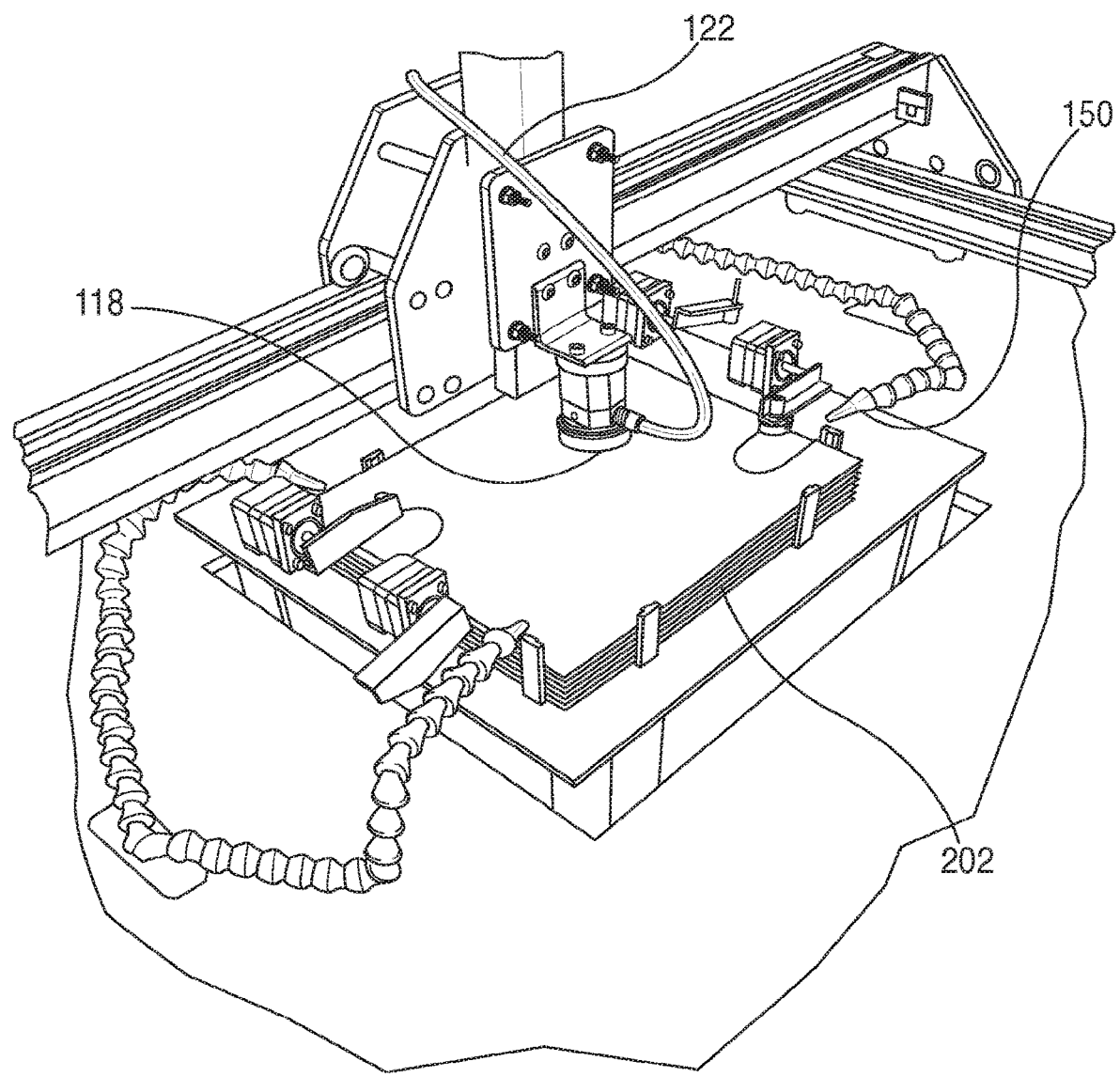
FIG. 3 depicts aspects of an example embodiment of a Coanda gripper element of an example transfer system according to one aspect of the invention.

To pick up a substrate sheet 202a . . . n from the platform 132, hold-down prongs 142 are used to hold down the second sheet. The XYZ positioner 116 lowers the felted gripper 124 until the felted material 304 comes into contact with the top surface of the top sheet. The felted material 304 entangles with the substrate sheet material and thusly grips the substrate sheet (such as topmost substrate sheet 202a). The XYZ positioner 116 retracts and picks up the sheet, the sheet is die cut with notches which are alternated as shown in FIG. 2 and using the prongs the top sheet is stripped from the sheet below. In some instances the sheets are stacked on top of compliant foam material on the material feeder 102 to improve the compliance of the stack to improve the adherence of the felt to the sheet. The XYZ positioner 116 then moves the felted gripper 124 to the printer platen 140 and the substrate sheet is placed onto the platen 140. Because the felted gripper 124 is typically a needle felted or similar material, where the fibers of the felt are entangled and frizzy, they entangle in the matrix of the non-woven substrate, thus allowing it to be picked up by the gripper 124.

The felted gripper 124 further comprises one or more spring-loaded pins 306 with magnetic tips 308 at one end and a bearing surface 310 at the other end. The spring-loaded pins 306 are disposed so that, in their rest position, the bottom surfaces of the magnetic pins are about even with the bottom surface of the felted material 304, or the bottom surfaces of the magnetic pins may be above the bottom surface of the felted material 304. Thus, when the felted gripper 124 comes into contact with the top surface of a substrate sheet on the material feeder 102, the pins 306 will not defeat the ability of the felted material 304 of the felted gripper 124 to engage and hold a substrate sheet 202a . . . n. The spring is disposed between upper surfaces of the plate 300 and the bearing surface 310 of the pin 306.

In one embodiment, the surface of the platen 140 comprises ferromagnetic material. The entire platen 140 may be made of a ferromagnetic material, or only the surface of the platen 140, or only certain portions of the surface of the platen 140 may comprise a ferromagnetic material. For example, the platen 140 may be aluminum with a thin sheet of steel disposed on its top surface. To place a substrate sheet onto the platen 140, the XYZ positioner 116 lowers the felted gripper 124 to the surface of the platen 140. As the bottom surface of the gripper nears the top surface of the platen 140, the magnetic tips 308 of the spring-loaded pins 306 are attracted to and engage the ferromagnetic material comprising the surface of the platen 140. At this point, the substrate sheet is captured between the tips of the spring-loaded pins 306 and the platen 140. The XYZ positioner 116 then lifts the felted gripper 124 away from the platen 140. Due to the magnetic forces, the spring-loaded pins 306 remain engaged with the platen 140 as the felted gripper 124 begins to move away from the platen 140. As the gripper continues to move away, the substrate sheet remains pinned to the platen 140 due to the magnetic forces, at least until the sheet detaches from the felted material 304 of the gripper 124. Then, as the gripper 124 further continues to move away from the platen 140, the springs becomes compressed so that the forces of the springs eventually overcome the magnetic forces causing the tips of the spring-loaded pins 306 to disengage from the platen 140, thereby leaving the substrate sheet 202a . . . n on the surface of the platen 140. The length of the spring-loaded pins 306, the strength of the springs used therein, and the strength of the magnets comprising the tips 308 of the spring-loaded pins 306 are selected so that the magnetic forces are stronger than the bond between the felted gripper 124 and the substrate sheet 202a . . . n, and the spring forces of the pins 306 as they compress become stronger than the magnetic forces between the tips 308 of the pins 306 and the platen 140.

In an alternative embodiment of the felted gripper 124, pins without springs can be used. In this embodiment, the pin is light enough or otherwise disposed so that when the felted material 304 grips a substrate sheet 202a . . . n on the material feeder 102, the pins will not defeat the bond between the gripper 124 and the sheet 202a . . . n. When the gripper 124 is moved to the platen 140, it will operate as otherwise described above. However, instead of relying on spring forces to cause the magnetic tips 308 of the pins to disengage from the platen 140, as the gripper 124 moves away from the platen 140, the bearing surfaces 310 of the pins 306 are constrained by the plate 300 and thusly break the magnetic bond between the pins 306 and the platen 140.

In any of the embodiments of the felted gripper 124, a material other than felted material suitable to engage a substrate sheet through entanglement or other technique may be used. Such alternative material may comprise, for example, but is not limited to, tape or other adhesive, or electrostatic forces. In the case where electrostatic forces are used, the use of pins—spring-loaded or otherwise—may be eliminated. Instead, an electrical current to the gripper for generating the electrostatic forces may be turned on for purposes of gripping a substrate sheet and turned off for purposes of releasing the substrate sheet.

Additionally, where pins 306 with magnetic tips 308 are used, such magnets may be electromagnets. In this embodiment, an electrical current to the gripper 124 for generating a magnetic field may be turned on for purposes of causing the pins spring-loaded or otherwise—to engage the surface of the platen 140 and turned off for purposes of disengaging the pins 306 from the surface of the platen 140.

In a further alternative embodiment, rather than magnetic tips, the tips of the pins—spring-loaded or otherwise—may comprise vacuum grippers. In this embodiment, the platen need not comprise a ferromagnetic surface. When the gripper lowers a substrate sheet 202a . . . n onto the platen 140, the vacuum grippers are turned on and thusly engage the surface of the platen 140, thereby clamping the substrate sheet 202a . . . n to the platen 140. As the gripper 124 moves away from the platen 140, the vacuum forces are sufficient to remain engaged with the platen 140 surface until the substrate sheet 202a . . . n disengages from the felted material 304. Where spring-loaded pins 306 are used, as the gripper 124 continues to move away from the platen 140, the spring forces overcome the vacuum forces to disengage the vacuum grippers from the surface of the platen 140. Where springs are not used, the bearing surfaces 310 of the pins as they are constrained by the plate 300 can overcome the vacuum forces. Alternatively, instead of relying on springs or constraining of the pins, the vacuum gripper could simply be turned off so that the pins disengage from the surface of the platen 140 at the appropriate time.

Material Feeder.

In some embodiments, the material feeder 102 has several subparts/systems, including the frame and platform, sheet openings, and hold-down prongs and gripper. Alternative embodiments include a slip sheet embodiment as well as a roll/web based system.

Figure 11:
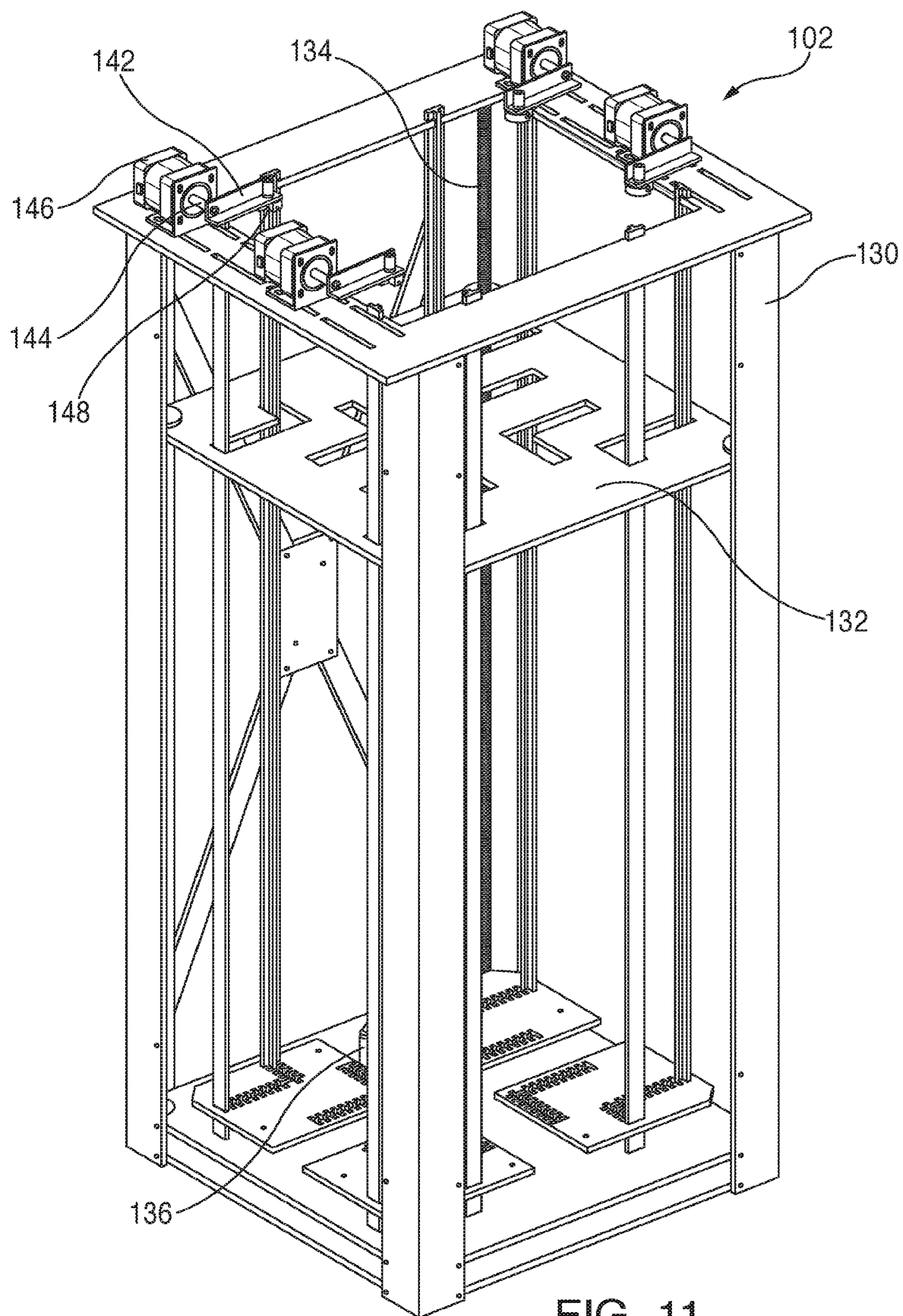
Figure 12:
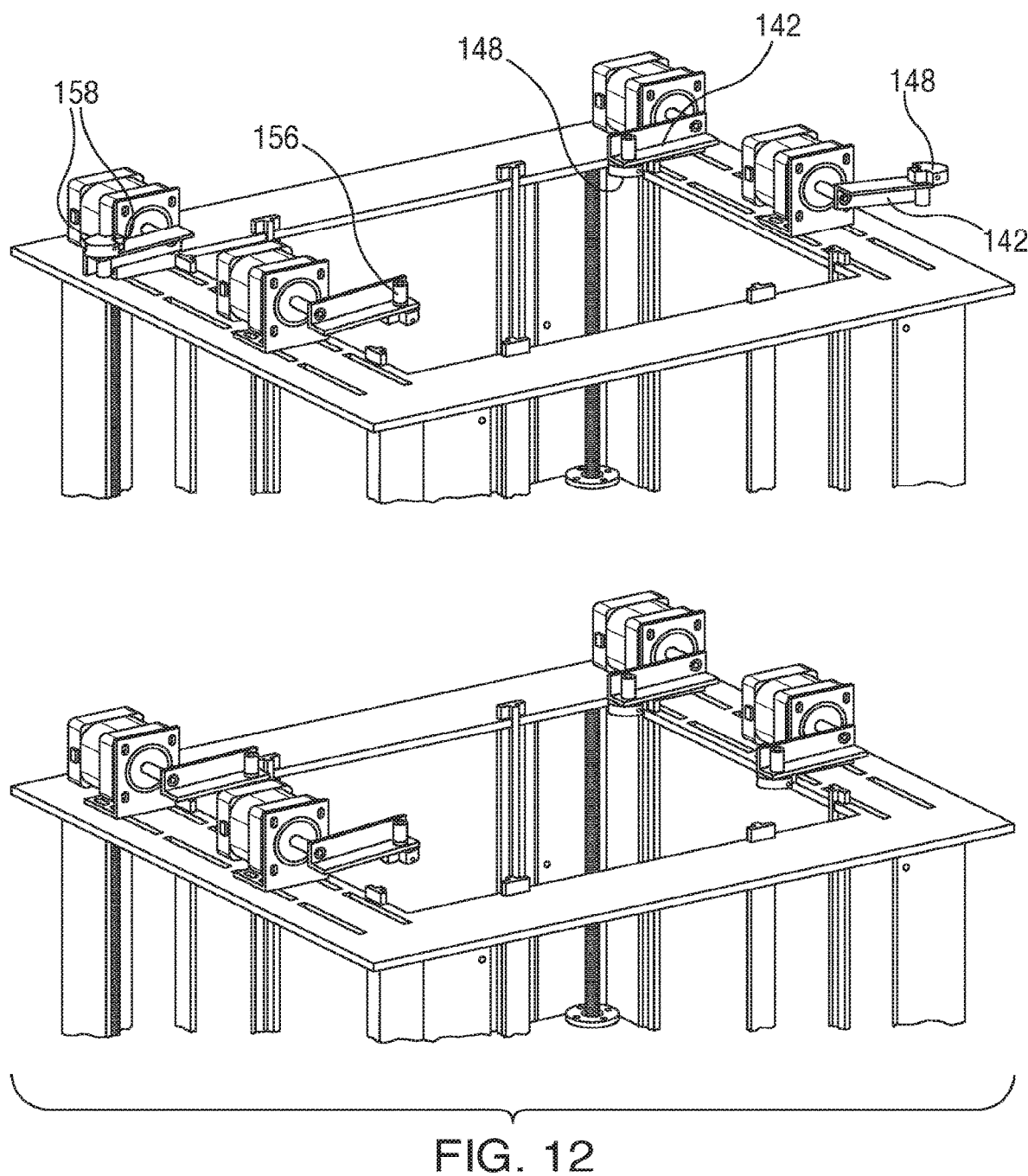
FIG. 12 shows another view of an example embodiment of a material feeder according to one aspect of the invention.
Figure 13:
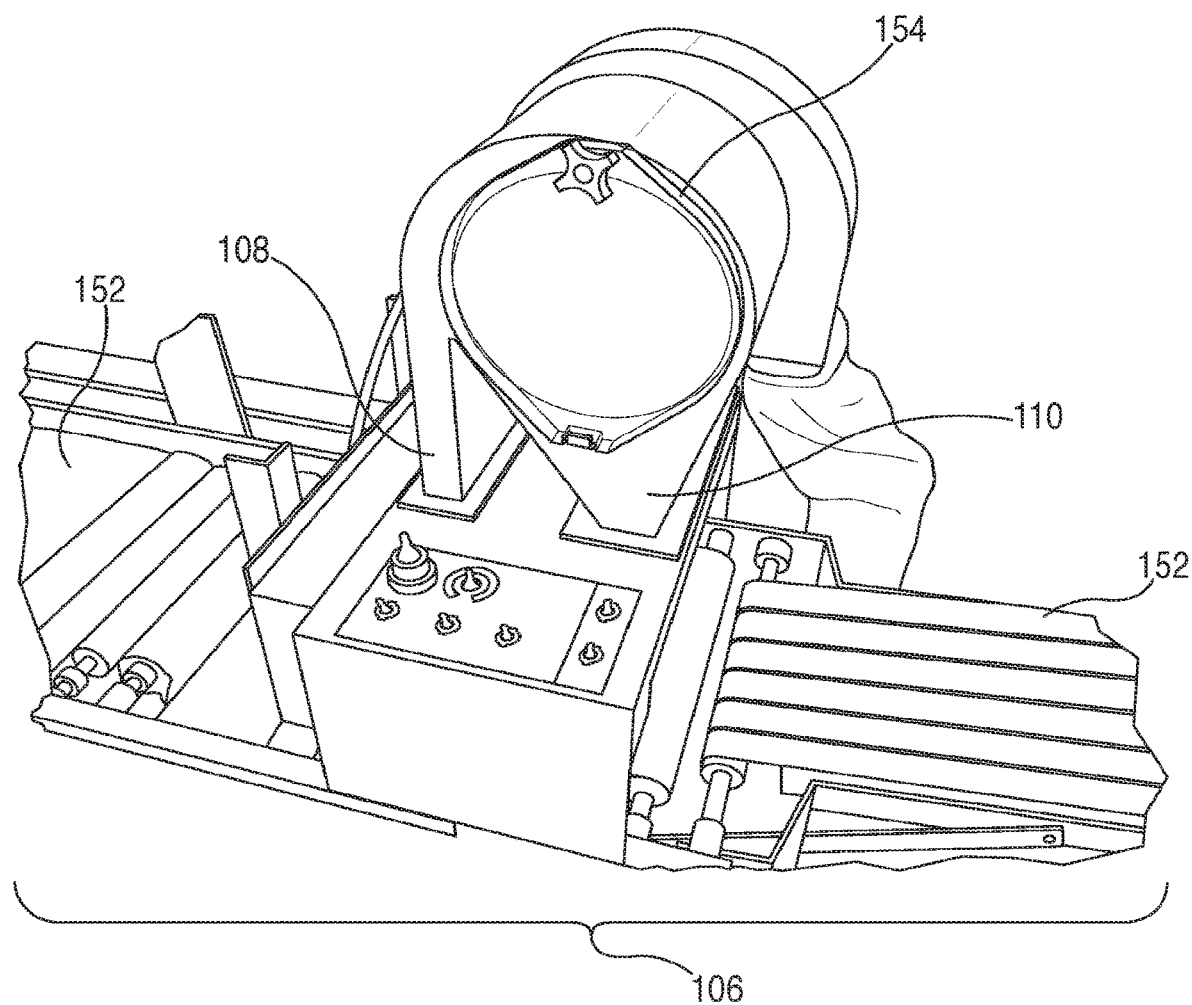
FIG. 13 is a top-side view of an example implementation of aspects of a powder system according to one aspect of the invention.
Figure 14:
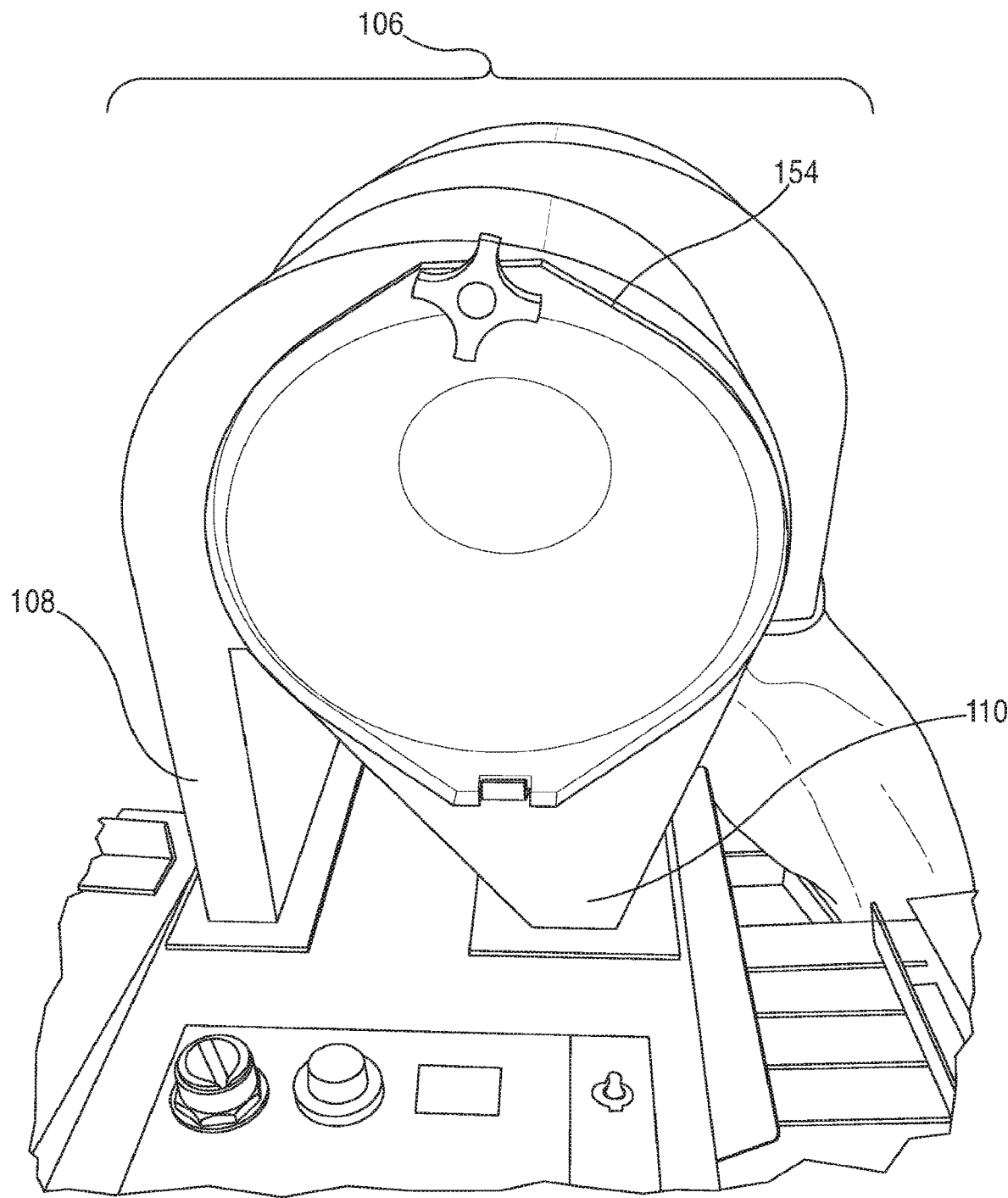
FIG. 14 is a front-side view of an example implementation of aspects of a powder system according to one aspect of the invention.
Figure 15:
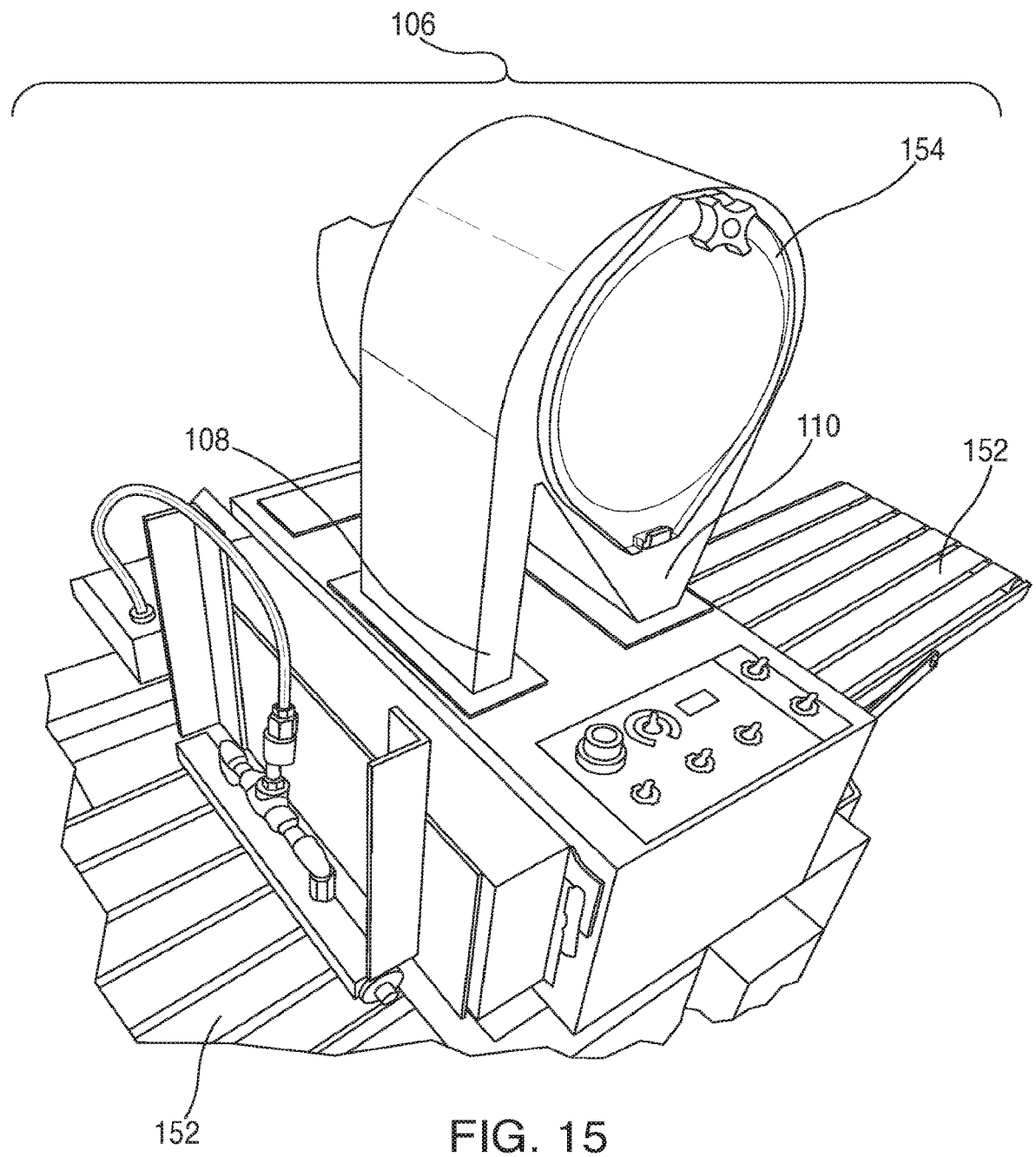
FIG. 15 is another top-side view of an example implementation of aspects of a powder system according to one aspect of the invention.
Figure 16:
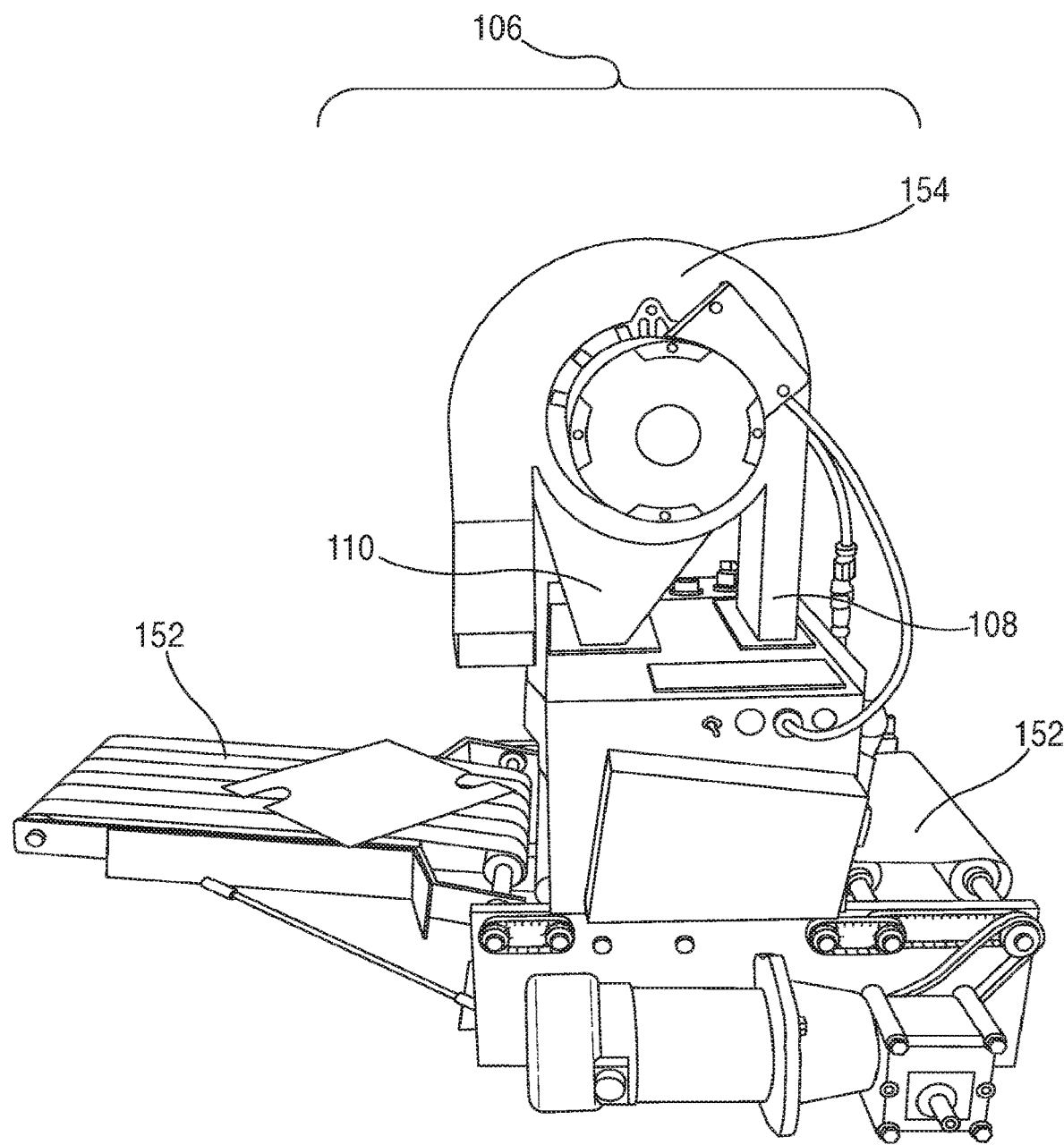
FIG. 16 is a rear-side view of an example implementation of aspects of a powder system according to one aspect of the invention.
Figure 17:
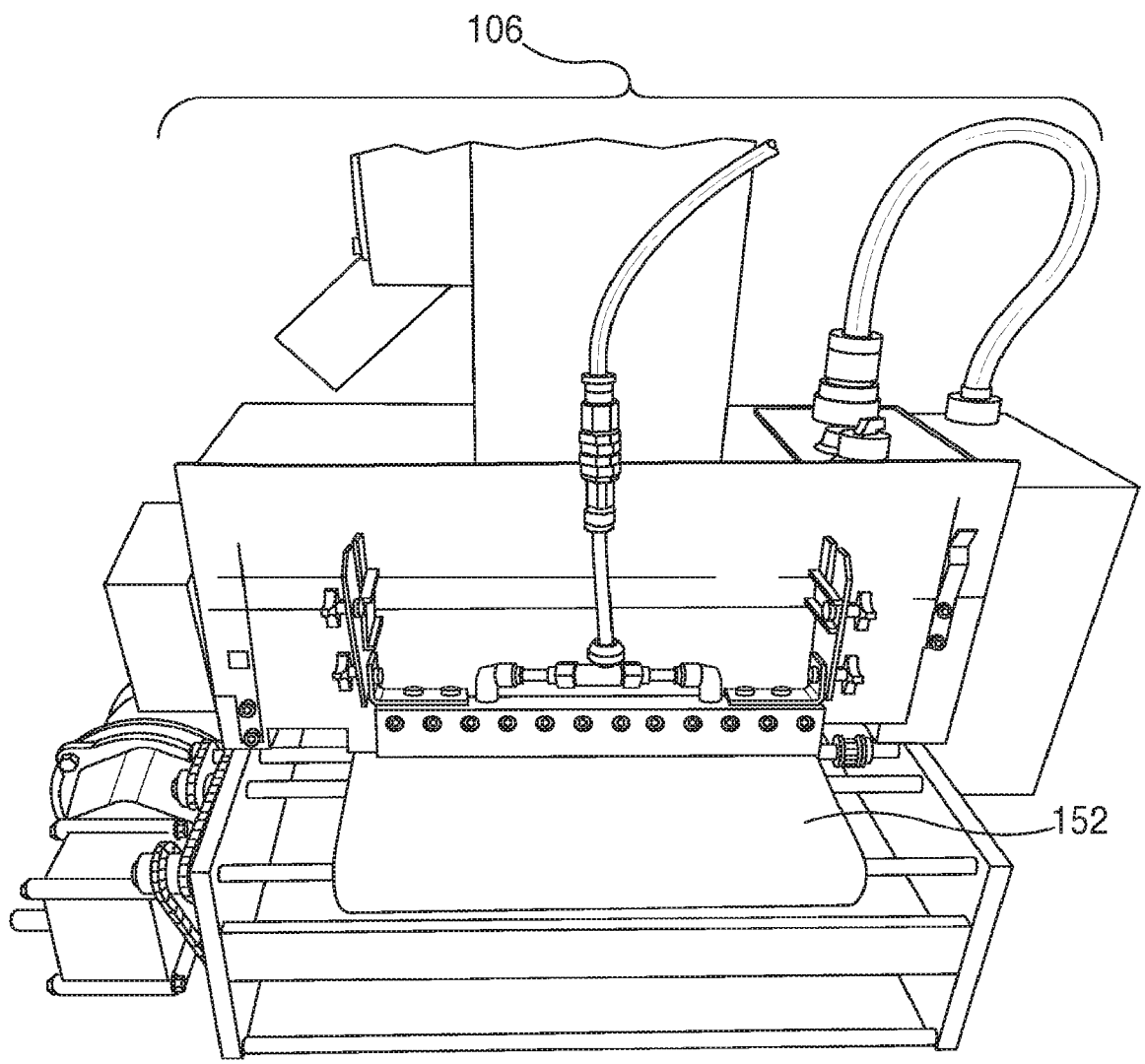
FIG. 17 is another side view of an example implementation of aspects of a powder system according to one aspect of the invention.
Figure 18:
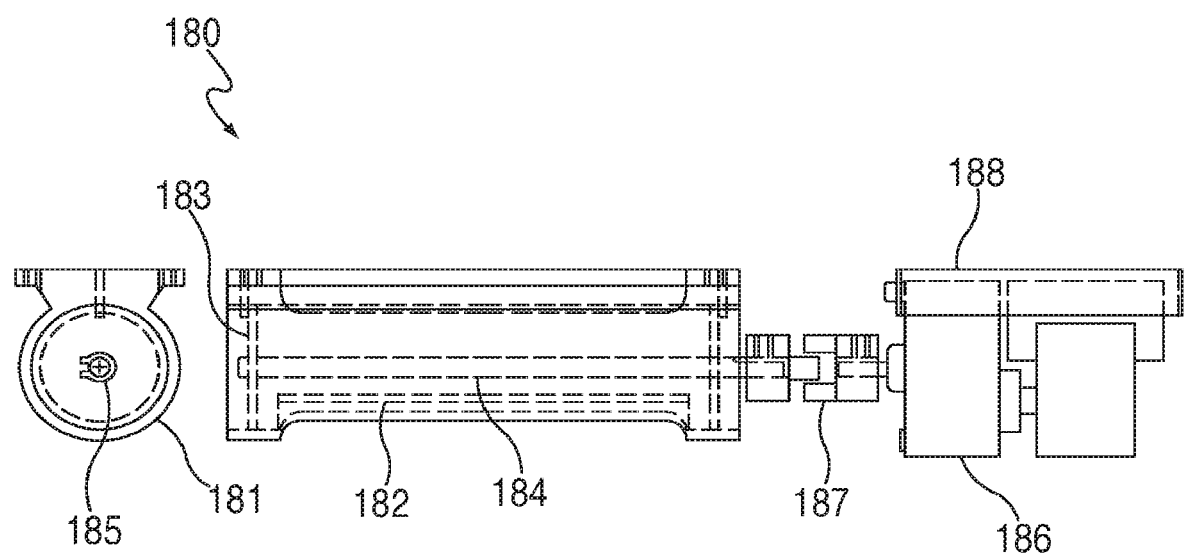
FIG. 18 is a schematic diagram of an alternative example implementation of aspects of a powder system according to one aspect of the invention.
Figure 19:
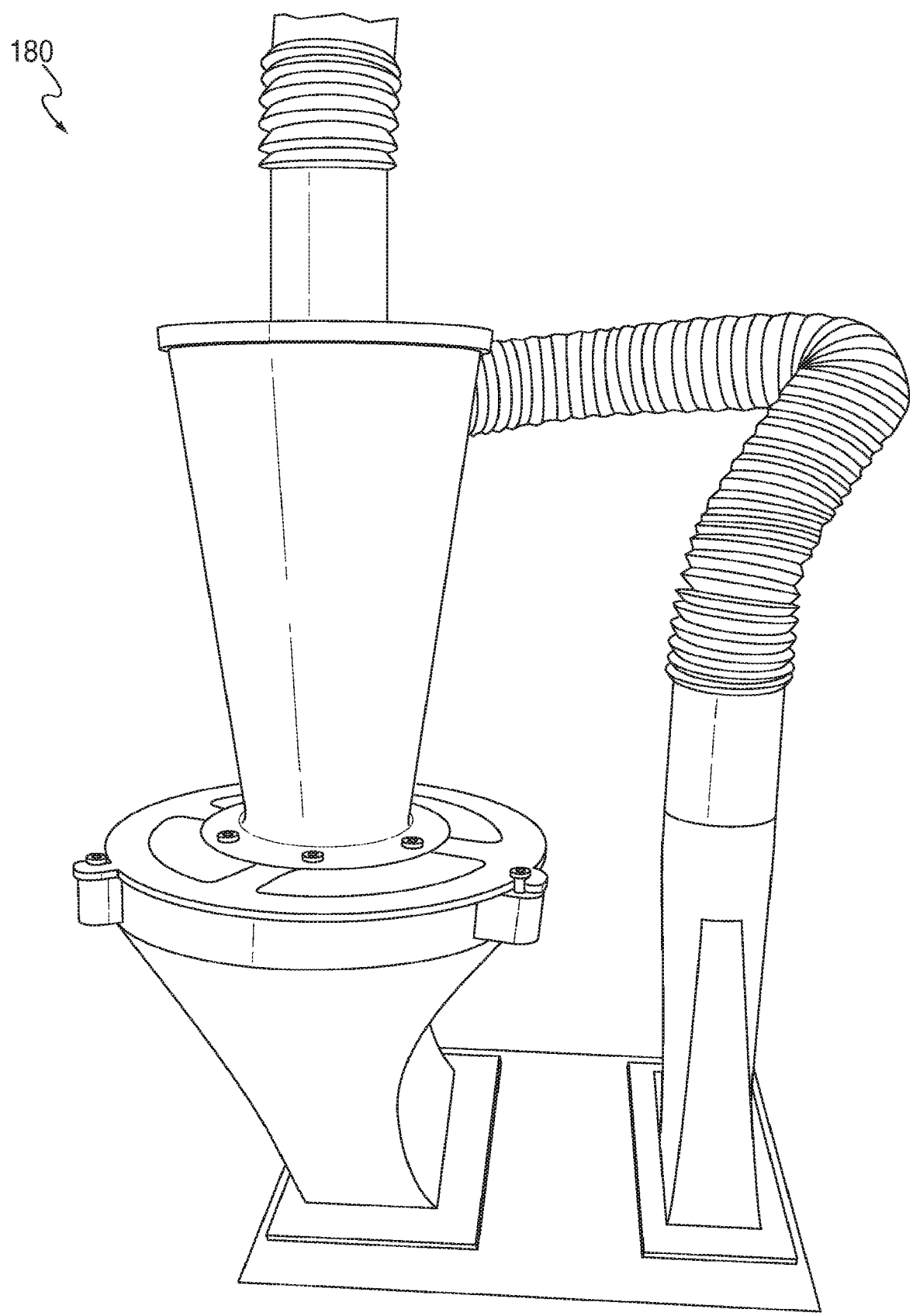
FIG. 19 depicts an example implementation of the alternative powder system of FIG. 18.
Figure 20:
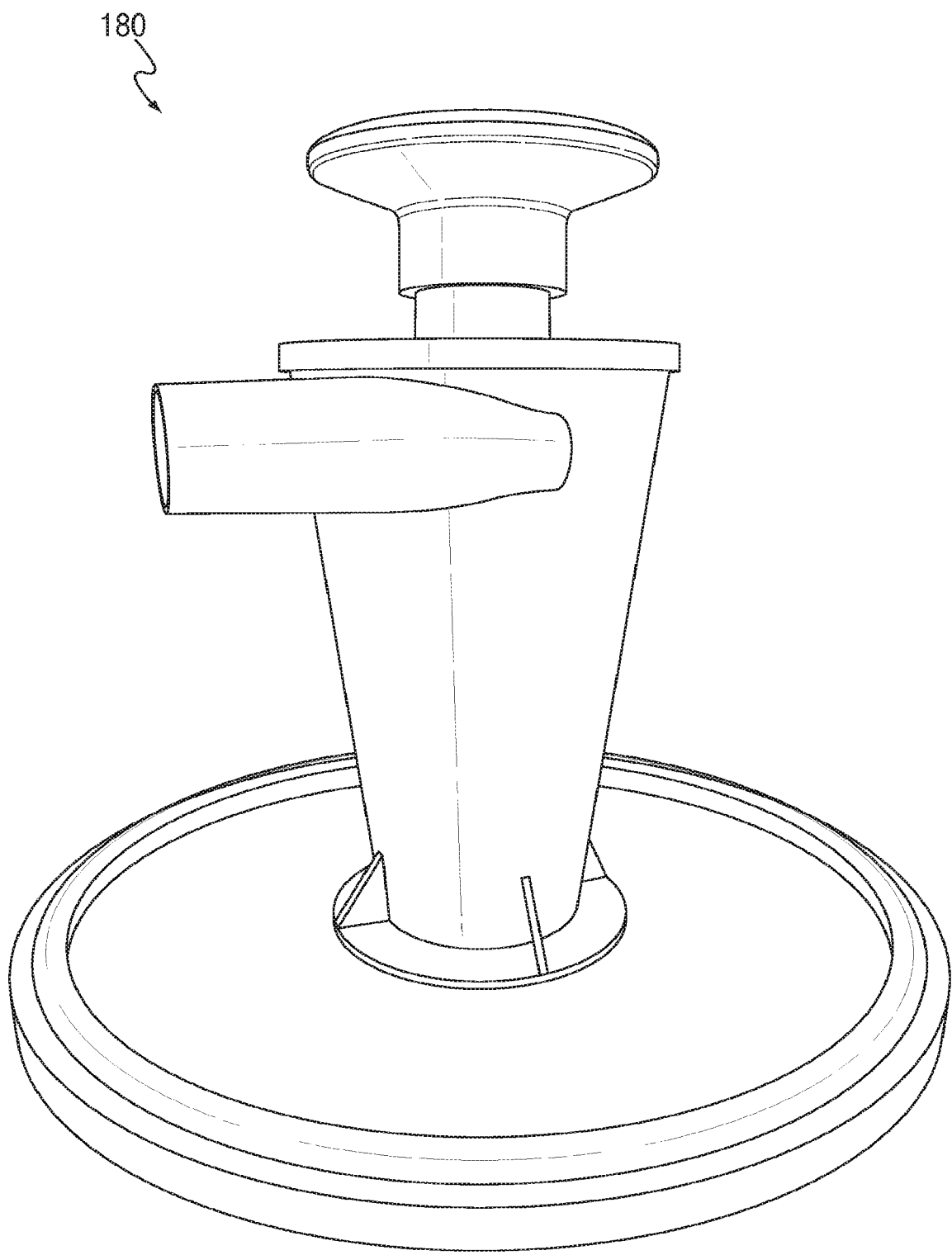
FIG. 20 is another view of the example implementation of the alternative powder system shown in FIG. 19.
Figure 21:
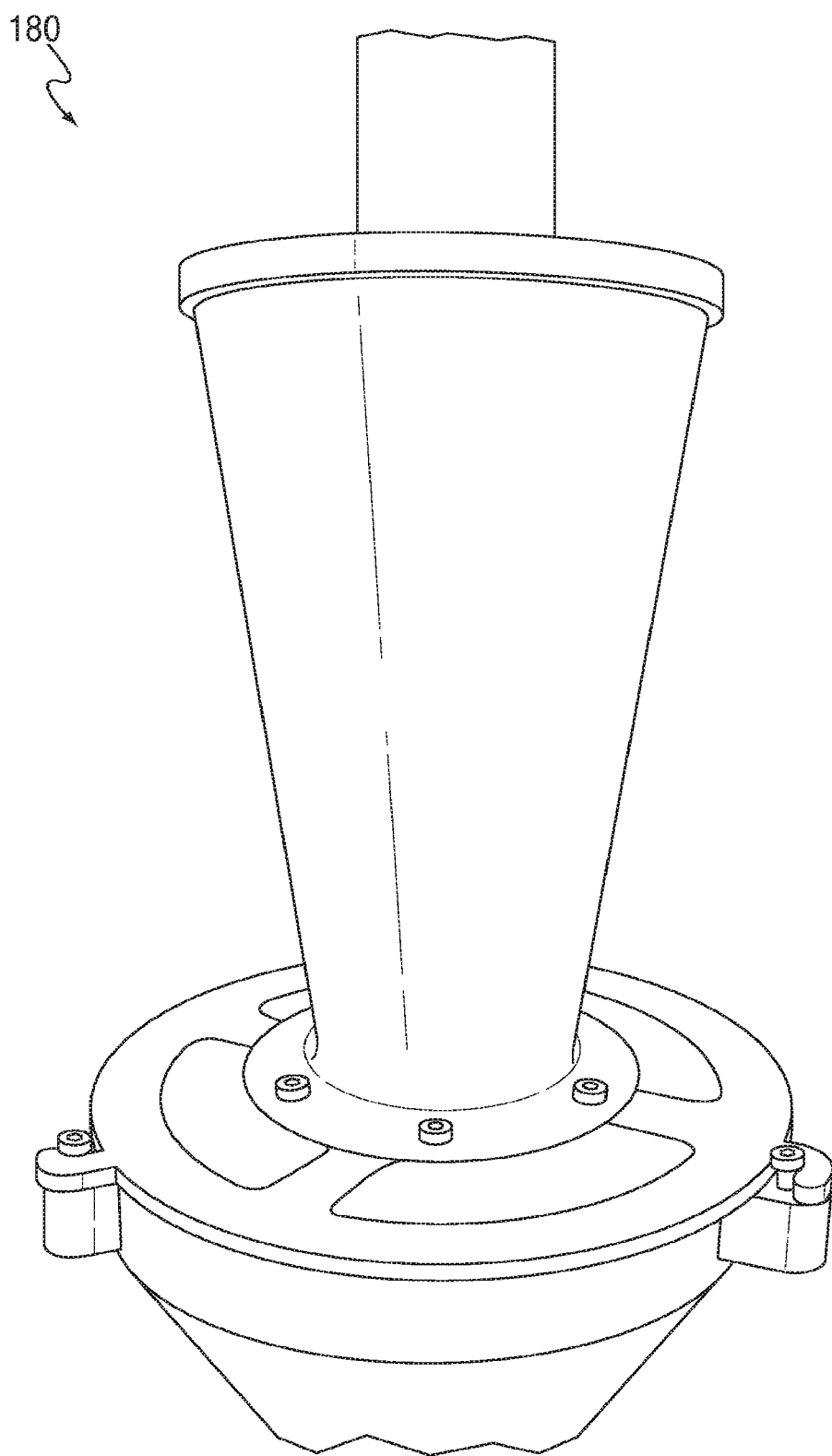
FIG. 21 is another view of the example implementation of the alternative powder system shown in FIG. 19.
Figure 22:
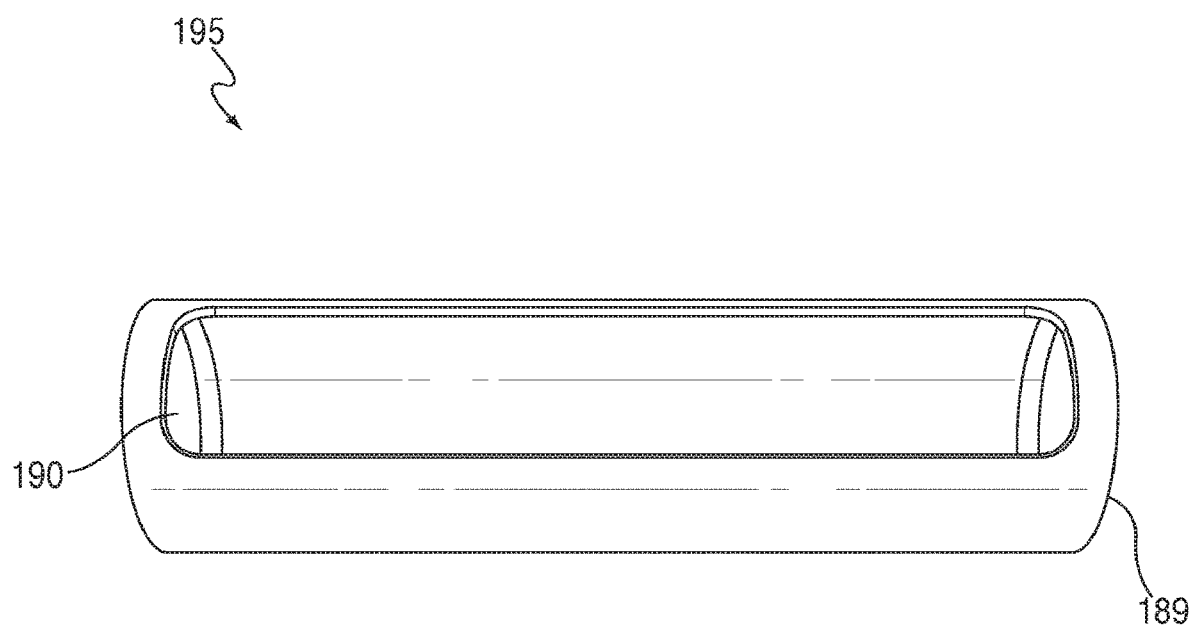
FIG. 22 depicts an example valve part of the alternative powder system of FIG. 18.
Figure 23:
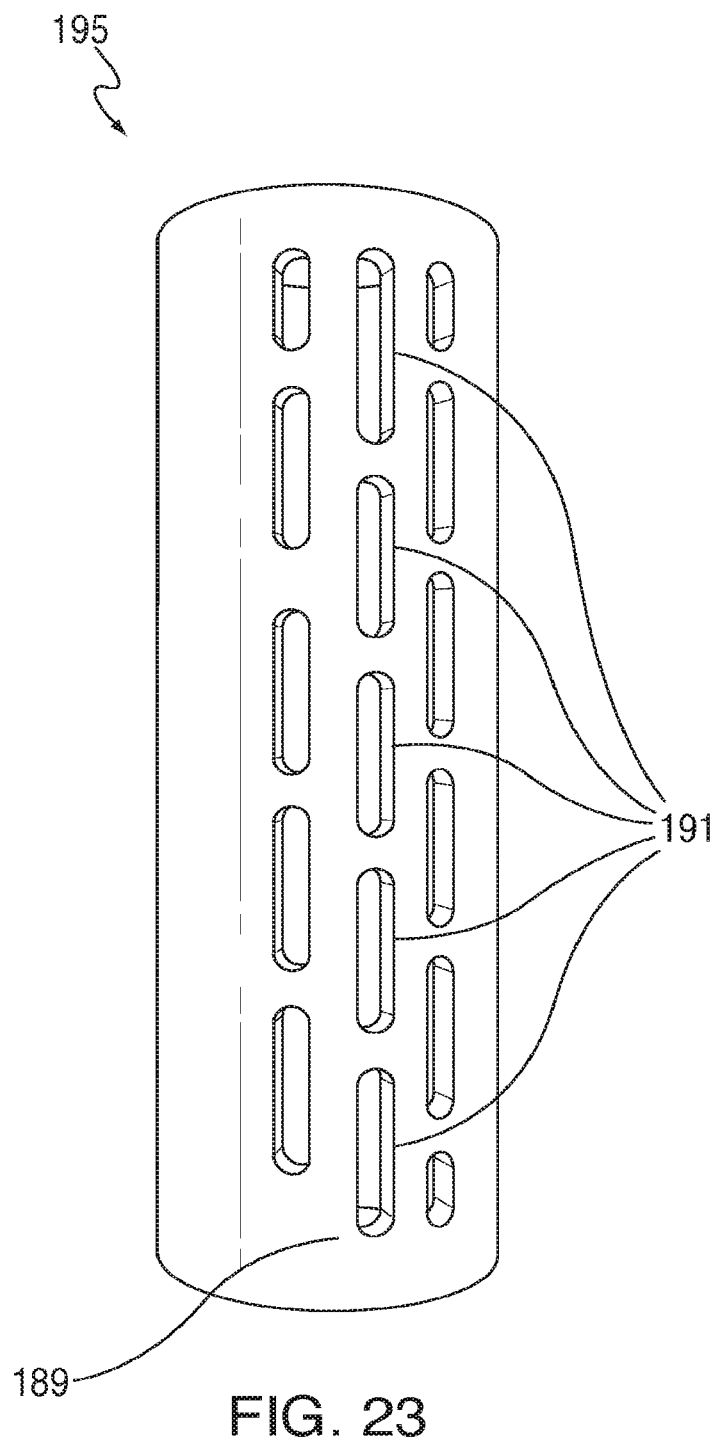
FIG. 23 depicts an alternative design of the valve part of the alternative powder system of FIG. 18.

Frame and Platform. In one embodiment, shown in FIG. 1 and in detail in FIGS. 11 and 12, the material feeder 102 comprises a frame 130, which houses a platform 132. The platform 132 is capable of holding a stack of substrate sheets 202, which are placed onto the platform 132 as needed. The material feeder 102 can have adjustable features to hold different size sheets. The platform 132 is raised or lowered using one or more lead screws 134 driven by one or more motors 136. While the embodiment in FIGS. 11 and 12 shows four lead screws 134 and a single stepper motor 136 with a belt for driving the lead screws 134, the platform 132 could be driven by a single lead screw and stepper motor, or any other combination of lead screws and stepper motors, or by a belt-driven system, or by any other suitable mechanisms known in the art or hereafter invented. The motors 136 are turned on and off by signals from a controller.

A distance sensor 138 is mounted on or in relation to the frame 130. The distance sensor 138 detects, as the platform 132 moves upward, when the top of the stack of substrate sheets 202 reaches a pre-defined distance from the sensor, known as the "sheet feed position." The distance sensor 138 can be any type of suitable sensor, including an optical distance sensor, such as, but not limited to, an encoder, a time of flight distance sensor or IR sensor. The distance sensor 138 is in communication with the controller. As the platform 132 moves upward, when the distance sensor 138 detects that the top of the stack of substrate sheets 202 has reached the pre-defined distance from the sensor 138 (the sheet feed position), the sensor 138 sends a signal to the controller indicating this condition. Upon receiving the signal from the distance sensor 138, the controller causes the motors to stop so that the platform 132 comes to a rest. Alternatively, a different kind of sensor can be used based on a switch which has a probe which moves up and down as the plate is pressed on the sheets.

Sheet Openings. In one embodiment, each substrate sheet includes at least two notches 204 or areas and at or near its edges, where material is removed or otherwise not present, as shown in FIG. 2. These notches 204 can be created for example by laser cutting, die cutting, or another method. In a first orientation, the notches 204 are at or near the top of the right-hand side of the sheet 202 and the bottom of the left-hand side of the sheet 202. In a second orientation, the notches 204 are at or near the top of the left-hand side of the sheet and the bottom of the right-hand side of the sheet. The sheets 202 are stacked in alternating fashion, so that a sheet of the first orientation is always between two sheets of the second orientation and vice versa, as shown in FIG. 2. Notches may serve usefully for orderly feeding of sequential sheets, registration among multiple processed sheets, or both. In preferred embodiments, printer-punched holes are used for such registration.

Hold-Down Prongs and Gripper. Two pairs of hold-down prongs 142 are mounted on the frame 130 for the material feeder 102. Each hold-down prong 142 is operably connected to a shaft 144 of a stepper motor 146 for pressing the prong 142 about the shaft 144. The stepper motors 146 are in communication with the controller. Each hold-down prong 142 comprises an optional foot 148 that includes a sheet-engaging surface. One pair of hold-down prongs 142 is positioned so that the feet 148 thereof align with the openings in substrate sheets of the first orientation and the other pair of hold-down prongs 142 is positioned so that the feet 148 thereof align with the openings in substrate sheets of the second orientation.

Detailed Operation. When the platform 132 reaches the sheet feed position (and assuming it is time to advance the next sheet from the feeder 102 to the printer 104), the controller sends a signal to the stepper motor of the XYZ positioner 116 that controls the Z movement of the Coanda gripper 118 to lower the gripper towards the top of the stack of substrate sheets 202. As the Coanda gripper 118 nears the top of the stack of substrate sheets 202, the controller sends a signal to turn on the forced air to the Coanda gripper 118 thereby activating it. The controller also sends a signal to stepper motors 146 causing their shafts 144 to rotate so that the hold-down prongs 142 connected to the shaft 144 which are pressed into the stack of sheets 202 and the feet 148 and thereof pass through the notches 204 in the top substrate sheet 202 and engage the surface of the substrate sheet below the top sheet (hereinafter "second sheet"). This could occur before, during, or after the movement of the Coanda gripper 118. The sheet-engaging surfaces of the feet 148 can optionally include a textured surface to ensure a better grip with the substrate sheet 202. The textured surface can be integral to the foot 148 or, for example, can be an additional material adhered, fastened or applied to the sheet-engaging surface of the foot 148, such as, but not limited to, sandpaper.

Each foot 148 can further include a connector 156 for attaching a forced air hose 122, conduits for channeling forced air through the foot 148, and vents 158 for forced air to pass out of the foot 148. The opposite ends of the forced air hoses 122 are connected to a manifold (not shown) comprising air valves so that the forced air to each hose 122 can be turned on or off The manifold is in communication with the controller.

When the Coanda gripper 118 comes near the top sheet of the stack of substrate sheets 202, the stepper motor 146 sends a signal to the controller and then the controller sends a signal to the manifold instructing it to open the valves supplying air to the feet 148. This causes forced air to pass through the vents 158 and thus between the top substrate sheet and the sheet engaged by the feet 148, i.e., a second sheet. The Coanda forces from the gripper then lift the top substrate sheet. The vents 158 are designed so that the air blows in spread fashion across a desired angle, for example to both the left and right of center, and slightly downward from the horizontal plane. The spread angle can vary based on a number of factors, such as the pressure of the forced air, the weight and porosity of the substrate sheets, the size of the sheets, and the location of the openings in the sheets. In general, this spread angle may be chosen so that the air flow maximizes separation between the top sheet and the second sheet. The combination of the feet 148 engaging the surface of the second sheet and the forced air between the top sheet and second sheet enables the Coanda gripper 118 to be able to lift and move the top sheet without also lifting the second sheet (or any sheets below the second sheet), and also without the second sheet sticking to the top sheet due to frayed fiber entanglement or otherwise.

After the first sheet is transferred to the printer 104, as further described below, the second sheet then becomes the top sheet of the stack to be transferred, and the process described above is repeated, but the other pair of hold-down prongs 142 are used, since they align with the openings in the second sheet and thus will pass through those openings to engage the surface of the sheet below the second sheet (which is now the top sheet).

In the embodiment described above, in addition to supplying forced air through the feet 148 of the hold-down prongs 142, air nozzles 150 or other blowers can be mounted on, or in relationship to, the frame 130 and used to blow air above or across the top surface of the top substrate sheet, creating Bernoulli forces to help lift the sheet. Such additional nozzles or blowers 150 can also be used to provide additional air between the top sheet and the one below it. In a further alternative embodiment, forced air is not supplied through the feet 148 of the hold-down prongs 142 and is provided through the above-described independent nozzles or blowers 150 mounted on or in relationship to the frame 130. Any of the many alternative ways of providing forced air could also be used, for example, but not limited to, through areas of the prongs 142 other than the feet 148 or through nozzles mounted on the prongs 142.

Slip Sheet Embodiment.

In an alternative embodiment of the material feeder 102, hold-down prongs 142 are eliminated and forced air need not be directed between the sheets. Additionally, the sheets 202 need not include notches 204. Instead, a non-porous slip sheet, such as paper, is added between each pair of substrate sheets in the stack of sheets 202. A suitable gripper, such as a vacuum gripper or needle gripper, is then able to pick up the top substrate sheet without picking up any other substrate sheets. In this embodiment, depending on the gripper used, after the top substrate sheet is transferred to the printer 104, the slip sheet will reside at the top of the stack of sheets 202 and can then be picked up and discarded using a suitable gripper or any other means. If the gripper used to pick up the substrate sheet is such that it also picks up the slip sheet, then the slip sheet can be removed at a later step in the process. This approach using slip sheets can be generally less preferable, because it requires an additional area to place the slip sheets after they are lifted from the stack, requires more pre-processing to create the stack of sheets (i.e., with a slip sheet interleaved between each pair of substrate sheets), and produces a large number of slip sheets which have to be either discarded or recycled, but it is contemplated that it might be useful in certain applications/embodiments.

Transfer of Sheets to the Printer.

After the gripper 118 grips the top sheet in any of the manners described above, the controller sends a signal to the stepper motor causing the gripper 118 to move upward a pre-defined distance. The distance sensor 138 can be used to confirm that the gripper 118 is holding a sheet. Once confirmed, or when the gripper 118 otherwise begins to move away from the stack of sheets 202, the controller sends a signal to the manifold turning off the air to the hold-down prongs 142 and then sends a signal to the stepper motor 146 to rotate the hold-down prongs 142 off of the second sheet. Meanwhile, the controller also sends a signal to the XY positioner, causing the gripper 118 to move towards the printer platen 140. When the gripper 118 reaches a pre-defined position over the platen 140, the controller sends signals to the stepper motor 146 and air manifold so that the substrate sheet is lowered and placed on the platen 140 and the gripper 118 releases the sheet so that the substrate sheet is resting on the platen 140. The gripper 118 and XYZ positioner 116 are designed so that they locate the sheet on the printer platen 140 with good precision. The controller then sends a signal to the XYZ positioner 116 causing the gripper 118 to return to its initial position above the material feeder 102.

Although the present description uses an XYZ positioner, it will be clear to one of skill in the art that the system can be built with simply an XZ positioner moving the grippers left and right and up and down or even an X positioner moving the grippers left and right but with the positioners located in such a manner as not to require up and down movement.

Printer.

The printer 104 is activated using a controller typical under program control of a computer to print the layer shapes onto the substrate sheet in the manner previously described. In this operation, the positioner on which the print heads 105 are mounted can be stationary, such that the print heads 105 move only in the Y-direction and the sheet is advanced under the print heads 105 by movement of the platen 140 in the X-direction. Alternatively, the platen 140 can be held stationary during the printing operation and the positioner on which the print heads 105 are mounted can be advanced along the length of the substrate sheet as the print heads 105 are moved in either the X- or Y-direction. In either case, it is preferred that the printer 104 operates such that when the printing of layer shapes onto the substrate sheet is completed, the platen 140 is positioned so that the substrate is situated between the location of the positioner hosting the print heads 105 and the location of the powder applicator 108.

Punches.

The printer 104 may also optionally include one or more punches, either mounted on the same positioner arm as the print heads 105 or separately mounted in relation to the printer platen 140, so that, during or immediately prior to or after the printing operation, holes can be punched in the substrate sheet in desired locations. The holes are used later in the process to align the substrate sheets by loading them onto registration or alignment pins. Those pins can be part of a stacker subsystem, or part of a subsequent stacking operation, or both. In either case, preferably, the diameter of the holes is similar to the outer diameter of the registration pins to get the best registration. The punch can be, for example, a hole punch, a paper drill, or any other suitable mechanism known in the art. The punch can optionally include a mechanism for vacuuming the chads that are punched from the substrate sheets, or a separate vacuum, sweeping, or blowing mechanism can optionally be provided.

The locations for the holes on the substrate sheet are defined in relationship to where the layer shapes for the 3D part will be printed on the substrate sheet. The information about the hole locations is provided to the printer 104 along with the layer shape information. The computer for the printer 104 can generate signals to cause holes to be punched at the desired locations.

If the system does not include a punch or other mechanism for forming holes in the substrate sheets, then holes can optionally be created in the sheets as a precursor or post processing step. Alternatively the corners of the sheet can be used for registration. The layer can also be die cut using a die cutting station that is well known in the art and this can be done before or after printing and should in register with the printing. There are also a number of other ways of making holes that are well known in the art such as laser cutting.

Transfer of Sheets to Powder Applicator.

Upon completion of printing and, if included, punching, the needle gripper 120 is used to transfer the substrate sheet 202a . . . n to the powder system 106, which includes a conveyor 152 for feeding the substrate sheet into the powder applicator 108. More specifically, the printer 104 sends a signal to the controller, which then sends signals to the XYZ positioner 116, stepper motor 146, and air manifold so that the XY positioner moves the needle gripper 120 to a position above the substrate sheet (resting on the printer platen 140), the stepper motor moves the gripper downward until the needle gripper 120 contacts the top of the substrate sheet, and the manifold opens the air valve attached to the needle gripper 120 to activate it and thereby grip the substrate sheet. A preferred implementation uses a pneumatic cylinder for Z-movement, and only an X-positioner is used. As previously mentioned, a roll/web based system for feed can be used. The controller then sends further signals so that the stepper motor lifts the gripper (and thus the substrate sheet) upward, the XY positioner moves the gripper to an appropriate position above the conveyor 152 of the powder applicator 108, the stepper motor moves the gripper downward until the substrate sheet is placed on the surface of the conveyor 152, and then the gripper releases the substrate sheet onto the conveyor 152. The needle gripper 120 and XYZ positioner 116 are designed so that they locate the sheet on the conveyor 152 with good precision. The XY positioner then moves the gripper upwards and back to its original position to await the next sheet to be run through the printer 104.

If there is an error with the sheet, detected for example by a camera, the printer 104 can send an indicating signal to the controller and the controller can send a signal to the XYZ positioner 116 for the needle gripper 120 50 that, instead of transferring the substrate sheet to the powder applicator 108, the sheet is transferred to a discard area.

A needle gripper 120 suffices to pick up a substrate sheet 202a . . . n resting on the printer platen 140. This is facilitated by the fact that a single sheet is resting on the surface of the platen 140 rather than on a stack of substrate sheets 202. A felted gripper configured so that the felted material and pins do not interfere with or materially disturb the printing fluid that the printer 104 deposits onto the substrate sheet, could alternatively be used. Likewise, other gripper embodiments described herein or known in the art could be used. In general, a Coanda gripper is not as suitable for use in this configuration to transfer sheets from the printer platen 140 to the powder applicator 108. This is because there is no airflow under the sheet on the platen 140, which is a requirement for a Coanda gripper. This problem can be solved by introducing air below the sheet resting on the printer.

Though Coanda grippers and needle grippers are described in the detailed embodiments herein, the invention is not intended to be limited to such. Any gripper now existing or hereinafter invented that is capable of gripping or lifting substrate sheets, and particularly non-woven or otherwise porous substrate sheets, under the conditions herein described would be suitable for use in the invention.

Powder System.

As shown in FIG. 1, the powder applicator 108 and powder remover 110 are integrated to form a single component, the powder system 106. They may alternatively be provided as separate components. In either case, the powder system 106 can be set to run continuously so that, once a substrate sheet 202a . . . n is placed upon the conveyor 152, it automatically travels through the powder system 106. Alternatively, a controller in communication with both the XYZ positioner 116 and the powder system 106 can instruct the powder applicator 108 and powder remover 110 or subsystems thereof to turn on and off at the appropriate times.

The powder applicator 108 deposits powder, such as, but not limited to, thermoplastic powder, onto the surface of the substrate sheet (on which layer shapes have just been printed). The powder sticks to the printed (wet) areas on the sheet. The powder remover 110 then removes any powder that did not adhere to the sheet.

As an example, the powder can be applied by a device that is used in thermography machines such as those made by THERM-O-TYPE Corp, in which the powder applicator 108 and powder remover 110 are integrated into a single component. Such a device is shown in FIG. 1 and FIGS. 13-17 and consists of(i) a series of conveyors, (ii) a vibrating trough that holds typically polymer powder and has a slit through which powder flows to deposit powder on the sheet while it moves under the trough, and (iii) a vacuum 110 that removes the powder that did not adhere to the sheet while it moves under the vacuum 110. The vacuum subsystem which includes a vacuum motor and cyclone 154 sits above the conveyor 152. In the area below the vacuum subsystem, a series of star wheels are configured to hold the sheet down while it is exposed to the airflow of the vacuum subsystem. The cyclone 154 also re-circulates the vacuumed powder back to the trough for reuse. By use of the powder system 106, in addition to removing powder that does not adhere to the sheet, powder remains on the printed areas as previously described.

The cyclone 154 that is used in the THERM-O-TYPE and other similar machines removes, through its exhaust, a high percentage of particles and has a cutoff point of about 50 microns, that is, it does not recycle most particles that are smaller than 50 microns. It has been discovered that, when this happens, it substantially reduces the amount of powder deposited on the sheet and further means that a significant amount of powder is wasted, since the purpose of the cyclone 154 is to permit recycling of the powder. Part of the reason that the amount of powder deposited is decreased is that smaller particles are no longer deposited, which in turn reduces the total amount of powder deposited and, over time, most of the smaller particles are removed through the recycling process. When there are smaller particles in the distribution, the amount of powder deposited increases. Having a powder with a distribution of powder sizes centered at 50 microns works well, so the cutoff point of 50 microns removes a large percentage of particles, about 30%.

This problem is resolved by an alternative powder system embodiment 180, shown in FIGS. 18-23, or a dump valve assembly 180. The dump valve assembly 180 consists of a dump valve body 181, a dump valve 182, a washer bearing 183, a dump valve shaft 184, a retaining ring 185 (of size, e.g., 5/16"), a gear motor 186 (e.g., 1/120 hp), a flexible coupling 187, and a dump valve motor bracket 188. In this embodiment, the cyclone design is replaced with a conical design, such as, for example, the design used in the Dust Deputy. This design has a cutoff point that is much lower, on the order of a few microns, and therefore recycles over 95% of the powder. This leads to a high powder load deposition, since it does not lose smaller particles, and there is much less waste of particles. Additionally, the cyclone-based implementation has a "valve" 195 on the powder removal system that collects the powder in a tube 189 with oval holes 190 that revolves inside a housing (FIG. 22) and that alternately collects and then dumps the powder into the trough of the Thermograph. In the alternative embodiment, in addition to modification/replacement of the cyclone with a conical design, this tube is replaced with a delrin tube 189 (FIG. 23) having multiple slots 191 instead of the oval opening 190. This produces a better seal and stops air from coming in from below, preventing the powder from falling into the tube 189.

Additional Powder Removal.

In certain circumstances the amount of powder removal from the vacuum 110 is insufficient since some unwanted powder may still reside within the substrate sheet material. For this reason an air knife 160, such as, but not limited to, the X-Stream Air Blade Air Knife from Nex Flow Air Products Corp., can be added after the vacuum stage so that any remaining excess powder on the substrate sheet is removed (FIG. 1). The air knife 160 can be controlled by a programmed microcontroller.

In addition, the powder system 106 can be configured so that sheets go through the powder applicator and powder removal stages more than one time. The advantage is that depositing powder onto a substrate sheet in multiple trips can increase the amount of powder that adheres to the printed areas of the substrate sheet, which sometimes is desirable for making the 3D part. After the sheet completes transit through the powder system, the conveyors 152 may be reversed so that the sheet travels back to the entrance of the powder applicator 108 and then reversed again (now going forward) so that the sheet goes back through the powder system 106 again. In this embodiment, during travel in the reverse direction, one or both of the powder applicator 108 and powder vacuum 110 could be turned off. In an alternative embodiment, after a sheet exits the powder remover 110, a separate conveyor or transfer system can carry the sheet back to the conveyor associated with the entrance to the powder applicator 108, whereupon the sheet will travel back through the powder system 106. In these embodiments, the sheet may be flipped using any suitable mechanism known in the art, so that powder is applied the other side of the sheet. These steps can be repeated as many times as desired.

Fuser.

After the sheet has had powder applied and excess powder has been removed, it can be advantageous to melt the remaining powder on the sheet (i.e., the powder adhered to the printed areas of the sheet) so that the powder more permanently affixes to the sheet and is thus protected from displacement, disruption, or falling off during subsequent processing steps. To this end, an optional fuser component 112 (FIG. 1) may be disposed after the powder system 106. The fuser 112 may be disposed above, below, or adjacent to the conveyor 152 leading out of the powder remover 110. The fuser 112 may be, for example but not limited to, radiant, IR, or other heating method sufficient to melt and thus fix the powder to the sheet. As the sheet travels out of the powder applicator 108, the heat from the fuser 112 melts the powder on the substrate sheet causing it to fix to the sheet.

Further Embodiments.

Fiber Orientation.

If one is using substrates in which the fibers are arranged in a particular direction, such as unidirectional material or woven materials, the transfer system can be adapted so that the gripper is rotatable. This way, the sheets picked up by the gripper can be rotated, for example by 30, 45, or 90 degrees, before they are placed on the printer platen 140, so that when the sheets are finally stacked to make the 3D part, they have varying angles of fiber orientation relative to one another. This enables production of objects with better mechanical properties in multiple directions. Alternatively, instead of rotating the sheets prior to printing, the sheets may be rotated at any one of several other points along the process. The sheets may, for example, be rotated just after printing, using a turntable, by rotating the needle gripper 120, or by other rotating means. The sheets may also be rotated after powder removal or after fusing, in either case also using a turntable, by introducing another gripper at those locations that is capable of rotating the sheets, or by other rotating means known in the art. Another way to adjust directionality of the fibers is to use multiple sheet trays, with each sheet tray holding sheets in a different direction.

With an understanding of where along the process and to what degree the sheets will be rotated, the printer 104 prints the layers shapes of the 3D part in a corollary rotation so that, when the substrate sheets are stacked, the layer shapes from one substrate sheet to another are properly oriented for making the 3D part. Substrate sheet shapes other than squares or rectangles may also be used so that, when sheets are rotated and then stacked, all of the edges of the sheets in the stack will be aligned. For example, such other sheet shapes could include, but are not limited to, circles, octagons, and any other symmetric regular polygons. Additionally, sheets may be cut on different biases so that the fiber orientation can be varied, such as, for example, by 45 and 90 degrees, and then stacked in the appropriate order (at the sheet feeding step), thus eliminating the need to rotate the sheets.

Roll or Web Feeding.

Figure 24:
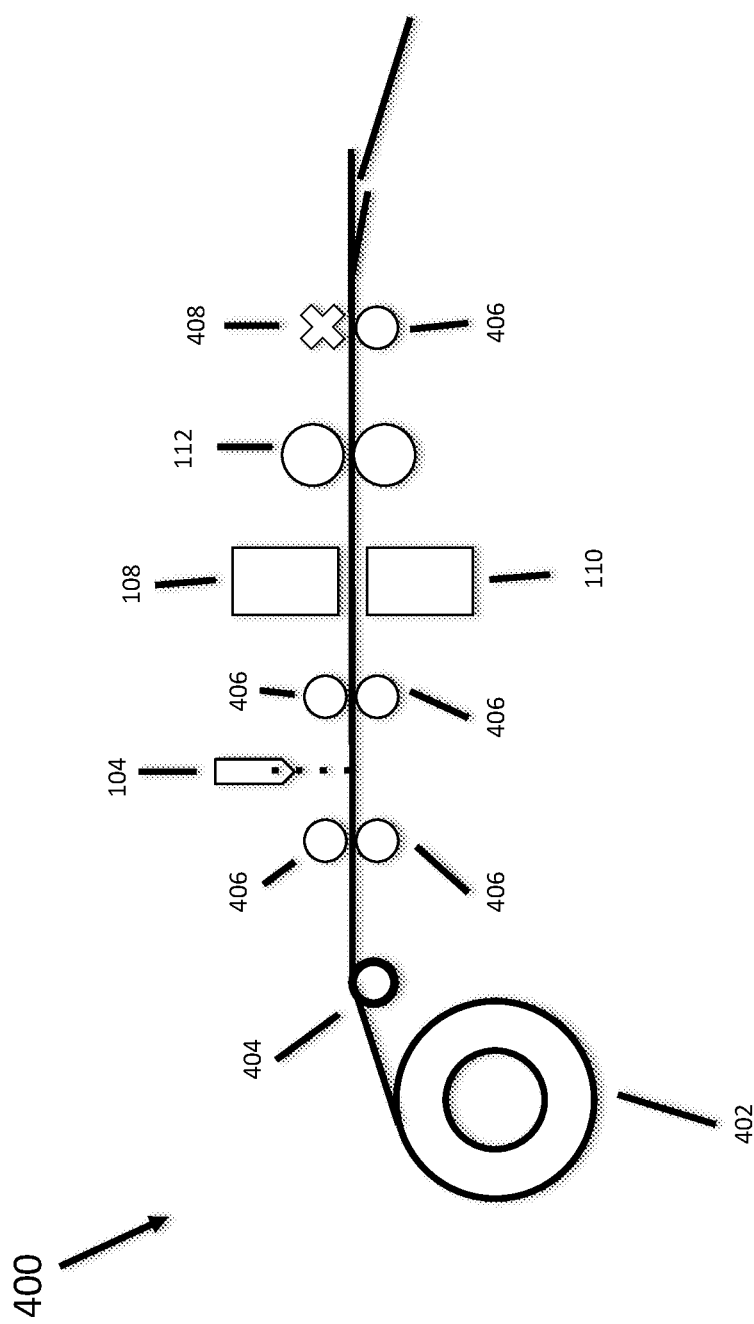
FIG. 24 depicts a roll-based continuous feed implementation.
Figure 25:
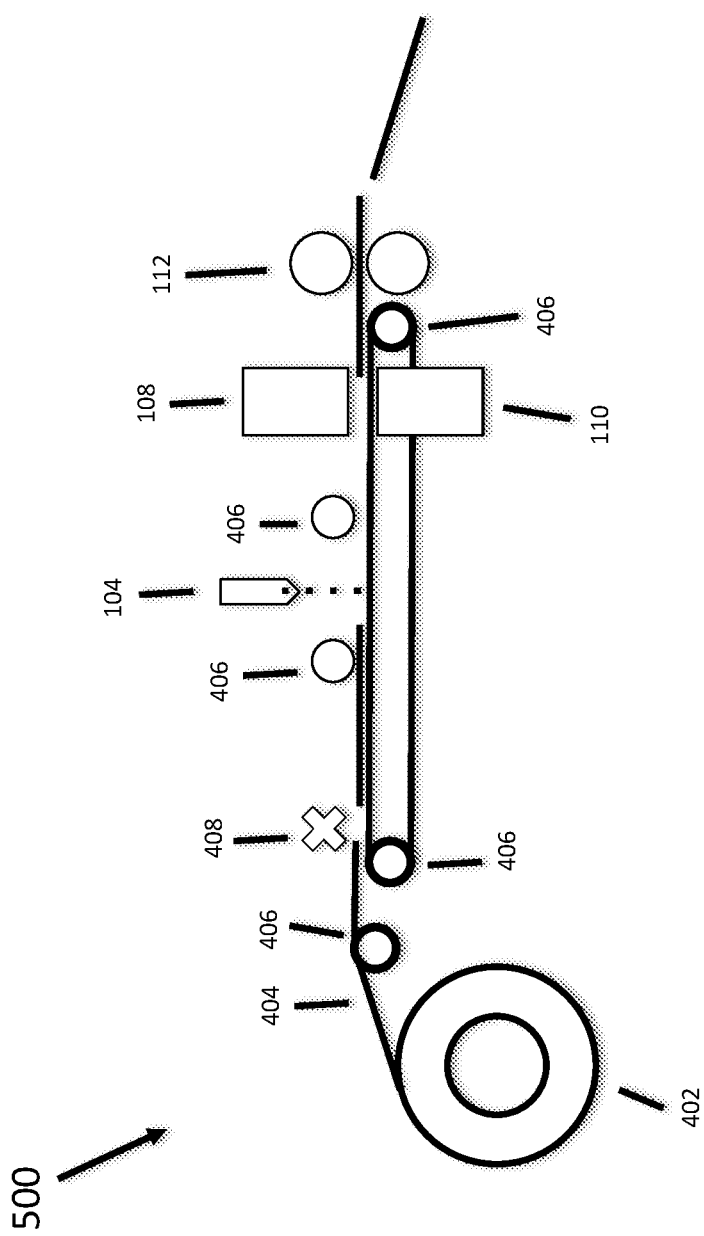
FIG. 25 depicts a roll-based roll to sheet implementation

Instead of using substrate sheets, a roll of substrate material may be used in the CBAM process and system described herein. FIG. 24 depicts a continuous feed roll implementation 400, and FIG. 25 depicts a roll to sheet implementation 500. In these embodiments, a roll of substrate material 402 is mounted and situated ahead of the printer 104. A tensioning system 404 together with feed rollers 406 are used to hold and advance the web defined by the length of the roll material fed through the system. The web 402 can extend through all of the components of the system—printer 104, powder applicator 108, powder remover 110, and, if present, fuser 112—and then be cut by a cutter 408 into single sheets prior to stacking. This is depicted in FIG. 24. Alternatively, as depicted in FIG. 25 the web 402 may be cut by the cutter 408 into single sheets at any prior point in the process. For example, the web 402 may be converted to a single sheet prior to advancing the resulting sheet onto the printer platen 140. The web 402 may be converted to a single sheet after the leading edge is situated on the platen 140. The web 402 may be converted to a single sheet after the printing operation is completed and before the resulting sheet is fed into the powder applicator 108, and so on.

Additional Sensors.

This apparatus can also optionally have a camera with vision software to ensure that it has not malfunctioned, that the appropriate amount of powder is deposited, that the sheets are moving as desired, and other quality assurance aspects of the process. Additional sensors may optionally be attached to the sheet feeder 102 to make sure that a sheet has been picked up, or that not more than one sheet has been picked up, or that no other malfunction has occurred. If the machine has not picked up a sheet, the operation can be run again. If two sheets are picked up, then rather than being transferred to the printer platen 140, they can be placed into a separate pile for reuse later or discarding. The machine may optionally have a light, buzzer, other alert, or any combination thereof, to inform the operator of the malfunction, at which point the problem can be addressed.

Controllers.

The process carried out by the system may be sequenced and monitored using microcontrollers or PLCs as follows. The sheet feeder 102 is informed by the control program to feed a sheet. After feeding a sheet onto the printer platen 140, the feeder 102 informs the control program which tells the printer 104 to begin printing. When the printer 104 has completed printing, it informs the positioner to move the needle gripper 120, which picks up the sheet 202$a$ . . . $n$ and deposits it on the powdering conveyor 152 and then informs the control program it has completed its task. These steps can optionally be overlapped, i.e., run in parallel as described above, in order to increase the speed of the process.

Printheads.

In embodiments described above, the printheads 105 are designed for rastering movement to deposit printing fluid on the substrate sheets 202. Alternatively, by using multiple inkjet heads staged across the width of the substrate sheet (or roll/web), or by using page-width heads like the Memjet head, the need for rastering can be eliminated. This enables the system to print much faster. For example, with certain heads, the system can be made to run at rates of up to 60 pages per minute or much higher, thus producing parts at speeds that rival injection molding speeds. Additionally, the print heads 105 may optionally be equipped with a bulk ink delivery system, so that the fluid used will need to be replaced less frequently.

It will further be clear to one of skill in the art that any of the elements of this design can be replaced with other elements with similar functions. This design can also be configured to be field-upgradable, so that individual elements can be replaced, improving the performance of the machine.

While preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

We claim:

1. An apparatus for the automated preparation of areas on a plurality of substrate sheets that correspond to cross sections of a three-dimensional (3D) object, comprising:
   a material feeder constructed to hold a plurality of non-woven substrate sheets;
   a transfer system comprising a felt gripper configured to pick up at least one of the plurality of non-woven substrate sheets from the material feeder and deposit it at a printer;
   the printer constructed to dispense fluid onto the at least one of the plurality of substrate sheets in regions that correspond to cross-sections of the 3D object;
   a powder system producing a processed substrate sheet by laying powder on the at least one of the plurality of non-woven substrate sheets, having a powder applicator and a powder remover, wherein the powder applicator is configured to deposit powder onto at least one of the plurality of substrate sheets; and the powder remover is configured to remove any powder that did not adhere to the at least one substrate sheet.

2. The apparatus of claim 1 wherein the powder remover is a cyclone system.

3. The apparatus of claim 1, wherein drivers move the felt gripper in the XY direction, and stepper motors, solenoids, or pneumatic positioners move the felt gripper in the Z direction.

4. The apparatus of claim 3, further comprising a controller in communication with the drivers, stepper motors, solenoids or pneumatic positioners.

5. The apparatus of claim 1, further comprising a second gripper configured to move the at least one of the plurality of substrate sheets from the printer to the powder system.

6. The apparatus of claim 1, wherein the printer includes print heads, and also includes one or more hole makers, mounted either upstream or downstream of the print heads, configured to create holes in the at least one of the plurality of substrate sheets to align the at least one substrate sheet for loading onto a set of registration pins attached to the apparatus.

7. The apparatus of claim 6 wherein the hole maker is a mechanical punch.

8. The apparatus of claim 6 wherein the hole maker is a laser cutter.

9. The apparatus of claim 6 wherein the registration pins are part of a stacker configured to stack a plurality of said processed substrate sheets.

10. The apparatus of claim 1 wherein plurality of non-woven substrate sheets include carbon fiber.

11. An apparatus for the automated preparation of areas on substrate layers that correspond to cross sections of a three-dimensional (3D) object manufactured by additive manufacturing of composite-based objects, comprising:
    a material feeder that holds a roll of substrate material;
    a printer for depositing fluid on a particular portion of the substrate material on the roll of substrate material after the particular portion has been transferred from the material feeder to the printer; a powder system having a powder applicator and a powder remover,
    wherein the powder applicator deposits powder onto the particular portion;
    the powder remover configured to remove powder that did not adhere to the particular portion.

12. The apparatus of claim 11 wherein the powder remover is a cyclone system.

13. The apparatus of claim 11, wherein the printer includes print heads, and also includes one or more hole makers, mounted either upstream or downstream of the print heads, configured to create holes in the particular portion of the roll to align the particular portion onto a set of registration pins attached to the apparatus after cutting or folding.

14. The apparatus of claim 13 wherein the hole maker is a mechanical punch.

15. The apparatus of claim 13 wherein the hole maker is a laser cutter.

16. The apparatus of claim 11 further comprising registration pins configured to align portions of the roll after cutting or folding.

17. A method for automated preparation of substrate layers that correspond to cross sections of a three-dimensional (3D) object, comprising:
    (a) transferring at least one sheet of a stack of substrate sheets from a material feeder to a printer;
    (b) depositing fluid on the particular at least one sheet in areas on the at least one sheet that represent said cross sections of the 3D object;
    (c) depositing powder onto the at least one sheet; removing any loose powder from the at least one sheet; whereby, the powder adheres to the areas on the at least one sheet that represent said cross sections of the 3D object;
    (d) subsequent to said removing of loose powder from the at least one sheet, stacking the at least one sheet on a stacker.

18. The method of claim 17 further comprising repeating steps (a)(d) for as many additional sheets as required to make the 3D object.

19. The method of claim 17, wherein the substrate sheets are non-woven.

20. The method of claim 17 wherein the step of transferring is performed with a dry erase felt.

21. The method of claim 17, wherein a printer is used to deposit fluid on the at least one sheet and the at least one sheet is transferred from the printer to a powder system using a needle gripper.

22. The method of claim 17 wherein the substrate sheets include non-woven carbon fiber.

23. An apparatus for the automated preparation of areas on substrate layers that correspond to layers of a three-dimensional (3D) object, comprising:
- a material feeder constructed to hold a plurality of substrate sheets;
- a transfer system comprising a gripper configured to pick up the at least one of the plurality of substrate sheets from the material feeder and deposit it at a printer;
- the printer constructed to dispense fluid onto the at least one of the plurality of substrate sheets in regions that correspond to cross-sections of the 3D object;
- a powder system producing a processed substrate sheet having a powder applicator and a powder remover, wherein the powder applicator is configured to deposit powder onto the at least one substrate sheet; and the powder remover is configured to remove any powder that did not adhere to the at least one substrate sheet.

\* \* \* \* \*